United States Patent
Li et al.

(10) Patent No.: US 11,716,469 B2
(45) Date of Patent: Aug. 1, 2023

(54) MODEL SELECTION IN NEURAL NETWORK-BASED IN-LOOP FILTER FOR VIDEO CODING

(71) Applicant: Lemon Inc., Grand Cayman (KY)

(72) Inventors: Yue Li, San Diego, CA (US); Li Zhang, San Diego, CA (US); Kai Zhang, San Diego, CA (US)

(73) Assignee: LEMON INC., Grand Cayman (KY)

(*) Notice: Subject to any disclaimer, the term of this patent is extended or adjusted under 35 U.S.C. 154(b) by 0 days.

(21) Appl. No.: 17/544,638

(22) Filed: Dec. 7, 2021

(65) Prior Publication Data
US 2022/0191483 A1 Jun. 16, 2022

Related U.S. Application Data

(60) Provisional application No. 63/123,973, filed on Dec. 10, 2020.

(51) Int. Cl.
*H04N 19/117* (2014.01)
*H04N 19/436* (2014.01)
(Continued)

(52) U.S. Cl.
CPC ............. *H04N 19/117* (2014.11); *G06N 3/08* (2013.01); *H04N 19/124* (2014.11);
(Continued)

(58) Field of Classification Search
CPC ...... G06N 3/08; H04N 19/117; H04N 19/132; H04N 19/70; H04N 19/82; H04N 19/436; H04N 19/174; H04N 19/172
See application file for complete search history.

(56) References Cited

U.S. PATENT DOCUMENTS

2019/0273948 A1* 9/2019 Yin ........................ G06N 3/08
2019/0289327 A1* 9/2019 Lin ....................... H04N 19/119
(Continued)

FOREIGN PATENT DOCUMENTS

CN 110046693 A 7/2019
CN 110401836 A 11/2019
(Continued)

OTHER PUBLICATIONS

"Content-Aware Convolutional Neural Network for In-Loop Filtering in High Efficiency Video Coding"—Chuanmin Jia, Shiqi Wang, Xinfeng Zhang, Shanshe Wang, Jiaying Liu, Shiliang Pu, and Siwei Ma; IEEE Transactions on Image Processing, vol. 28, No. 7, Jul. 2019. (Year: 2019).*
(Continued)

*Primary Examiner* — Mainul Hasan
(74) *Attorney, Agent, or Firm* — Conley Rose, P.C.

(57) ABSTRACT

A method implemented by a video coding apparatus. The method includes selecting a neural network (NN) filter model from a plurality of NN filter model candidates for each video unit. The NN filter model selected for a first video unit is different than the NN filter model selected for a second video unit. The method also includes converting between a video media file and a bitstream based on the one or more NN filter models selected for the video unit. A corresponding video coding apparatus and non-transitory computer readable medium are also disclosed.

20 Claims, 17 Drawing Sheets

(51) Int. Cl.
| | |
|---|---|
| H04N 19/82 | (2014.01) |
| H04N 19/186 | (2014.01) |
| H04N 19/169 | (2014.01) |
| H04N 19/70 | (2014.01) |
| H04N 19/124 | (2014.01) |
| H04N 19/176 | (2014.01) |
| H04N 19/132 | (2014.01) |
| G06N 3/08 | (2023.01) |

(52) U.S. Cl.
CPC ......... H04N 19/132 (2014.11); H04N 19/176 (2014.11); H04N 19/186 (2014.11); H04N 19/1883 (2014.11); H04N 19/436 (2014.11); H04N 19/70 (2014.11); H04N 19/82 (2014.11)

(56) References Cited

U.S. PATENT DOCUMENTS

| | | | |
|---|---|---|---|
| 2020/0012926 A1 | 1/2020 | Murata | |
| 2020/0120340 A1* | 4/2020 | Park | G06T 9/002 |
| 2020/0252654 A1* | 8/2020 | Su | H04N 19/176 |
| 2022/0103864 A1* | 3/2022 | Wang | H04N 19/70 |

FOREIGN PATENT DOCUMENTS

| | | |
|---|---|---|
| JP | 2018041319 A | 3/2018 |
| WO | 2018128239 A1 | 7/2018 |
| WO | 2019201239 A1 | 10/2019 |

OTHER PUBLICATIONS

Bross, et al., "Versatile Video Coding (Draft 10), Preview document for JVET-S2001 for Teleconference Meeting (MPEG No. 54716)," http://phenix.it-sudparis.eu/jvet/doc_end_user/current_document.php?id=10399. 2020, 1 page.

Suehring, "Update Version number and PDF version of Software Manual, VVC Software VTM, VTM-10.0,"https://vcgit.hhi.fraunhofer.de/jvet/WCSoftware_VTM/-/tags/VTM-10.0, 2021, 2 pages.

Sung-Chang Lim, et al., "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/2G 11, 12th Meeting: Macao, CN, Oct. 3-12, 2018, Document JVET-L0147, 8 pages.

Taquet, et al., "CE5: Results of Tests CE5-3.1 to CE5-3.4 on Non-Linear Adaptive Loop Filter," Joint Video Experts Team (JVET) of ITU-T SG 16 WP 3 and ISO/IEC JTC 1/SC 29/WG 11 14th Meeting: Geneva, CH, Mar. 19-27, 2019, Document JVET-N0242, 10 pages.

Bross, et al., "Versatile Video Coding (Draft 9)," Joint Video Experts Team JVET) of ITU-T SG 16 WP 3 and ISO/IEC JTC 1/SC 29/WG 11, 18th Meeting: by teleconference, Apr. 15-24, 2020, Document JVET-R2001, 530 pages.

Liu, et al., "Methodology and reporting template for neural network coding tool testing," Joint Video Experts Team (JVET) of ITU-T SG 16 WP 3 and ISO/IEC JTC 1/SC 29, 20th Meeting: by teleconference, Oct. 7-16, 2020, Document JVET-T0041, 14 pages.

Timofte, et al., DIV2K dataset: Diverse 2K Resolution High Quality Images as Used for the Challenges @NTIRE, https://data.vision.ee.ethz.ch/cvt/DIV2K/, downloaded from the internet Feb. 28, 2022, 6 pages.

Ma, et al., "BVI-DVC: A Training Database for Deep Video Compression," arXiv preprint arXiv: 2003.13552 (2020), 11 pages.

Bossen, et al., "JVET common test conditions and software reference configurations for SDR video," Joint Video Experts Team (JVET) of ITU-T SG 16 WP3 and ISO/IEC JTC 1/SC 29/WG11, 12th Meeting: Macao, CN, Oct. 3-12, 2018, Document JVET-L1010, 5 pages.

Balle, et al., "End-to-end optimization of nonlinear transform codes for perceptual quality," 2016 Picture Coding Symposium (PCS), IEEE, 5 pages.

Theis, et al., "Lossy Image Compression With Compressive Autoencoders," ICLR 2017, arXiv:1703.00395v1 [stat.ML] Mar. 1, 2017, 19 pages.

Li, et al., "Fully Connected Network-Based Intra Prediction for Image Coding," IEEE Transactions on Image Processing, vol. 27, No. 7, Jul. 2018, pp. 3236-3247.

Dai, et al., "A Convolutional Neural Network Approach for Post-Processing in HEVC Intra Coding," Springer International Publishing AG 2017, L. Amsaleg et al. (Eds.): MMM 2017, Part I, LNCS 10132, pp. 28-39, 2017. DOI: 10.1007/978-3-319-51811-4.

R. Song, D. Liu, H. Li and F. Wu, "Neural network-based arithmetic coding of intra prediction modes in HEVC," 2017 IEEE Visual Communications and Image Processing (VCIP), 2017, pp. 1-4, doi: 10.1109/VCIP.2017.8305104.

Pfaff, et al., "Neural network based intra prediction for video coding," Proc. SPIE 10752, Applications of Digital Image Processing XLI, 1075213 (Sep. 17, 2018).

"Line Transmission of Non-Telephone Signals, Video Codec for Audiovisual Services at p×64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

Wang, F., et al., "HEVC Multiple Description Video Coding with Parameters Reuse," Journal of Signal Processing, vol. 36, No. 9, Sep. 2020, 7 pages.

\* cited by examiner

FIG. 7

Residual block

MODEL SELECTION IN NEURAL NETWORK-BASED IN-LOOP FILTER FOR VIDEO CODING

CROSS-REFERENCE TO RELATED APPLICATIONS

This patent application claims the benefit of U.S. Provisional Patent Application No. 63/123,973 filed Dec. 10, 2020, by Lemon, Inc., and titled "Model Selection in Neural Network-Based In-loop Filter for Video Coding," which is hereby incorporated by reference.

TECHNICAL FIELD

The present disclosure is generally related to video coding and, in particular, to the in-loop filter in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide one or more neural network (NN) filter models trained as part of an in-loop filtering technology or filtering technology used in a post-processing stage for reducing the distortion incurred during compression. In addition, samples with different characteristics are processed by different NN filter models. The present disclosure also elaborates how to design multiple NN filter models, how to select from multiple NN filter models, and how to signal the selected NN filter index.

A first aspect relates to a method implemented by a coding apparatus. The method includes selecting a neural network (NN) filter model from a plurality of NN filter model candidates for each video unit, wherein the NN filter model selected for a first video unit is different than the NN filter model selected for a second video unit; and converting between a video media file and a bitstream based on the NN filter model selected for each video unit.

Optionally, in any of the preceding aspects, another implementation of the aspect provides deriving an NN filter model index containing the plurality of NN filter model candidates prior to the selecting.

Optionally, in any of the preceding aspects, another implementation of the aspect provides that the video unit is one of a sequence of pictures, a picture, a slice, a tile, a brick, a sub-picture, a coding tree unit (CTU), a CTU row, and a coding unit (CU), and wherein the plurality of NN filter model candidates corresponding to each of the sequence of pictures, the picture, the slice, the tile, the brick, the sub-picture, the CTU, the CTU row, and the (CU is different.

Optionally, in any of the preceding aspects, another implementation of the aspect provides the plurality of filter model candidates contain a first set of NN filter model candidates for luma components of the video unit and a second set of NN filter model candidates for chroma components of the video unit.

Optionally, in any of the preceding aspects, another implementation of the aspect provides that the first set of NN filter model candidates contains a different number of the NN filter model candidates than the second set of NN filter model candidates.

Optionally, in any of the preceding aspects, another implementation of the aspect provides that the plurality of NN filter model candidates is dependent upon a tree partition structure for the video unit, and wherein the tree partition structure comprises single tree or dual tree.

Optionally, in any of the preceding aspects, another implementation of the aspect provides that one or more syntax elements are signaled or derived to represent an NN filter model index, and wherein the NN filter model index corresponds to an NN filter model candidate.

Optionally, in any of the preceding aspects, another implementation of the aspect provides that the NN filter model index corresponds to one of the plurality of NN filter model candidates.

Optionally, in any of the preceding aspects, another implementation of the aspect provides that an NN filter model index that identifies one or more of the plurality of NN filter model candidates is signaled for each color component in the video unit.

Optionally, in any of the preceding aspects, another implementation of the aspect provides a flag indicating whether the NN filter model index is shared by different color components in the video unit is signaled.

Optionally, in any of the preceding aspects, another implementation of the aspect provides a flag indicating whether the NN filter model selected is to be utilized for the video unit or for color components of the video unit is signaled.

Optionally, in any of the preceding aspects, another implementation of the aspect provides that the flag is binarized to a bin string, and at least one bin is coded with one or more contexts or coded with a bypass mode Optionally, in any of the preceding aspects, another implementation of the aspect provides the flag is binarized with a fixed length code, a unary code, a truncated unary code, an Exponential-Golomb code, or a truncated Exponential-Golomb code.

Optionally, in any of the preceding aspects, another implementation of the aspect provides that the flag is binarized based on coding information of a current block or neighboring block, and wherein the coding information includes one or more quantization parameters.

Optionally, in any of the preceding aspects, another implementation of the aspect provides that a flag is signaled to indicate whether the NN filter model index is at least partially predicted based on a previous NN filter model index or is inherited from the previous NN filter model index.

Optionally, in any of the preceding aspects, another implementation of the aspect provides that the flag is signaled at a picture level, at a slice level, at a coding tree block (CTB) level, or a coding tree unit (CTU) level.

Optionally, in any of the preceding aspects, another implementation of the aspect provides that the flag indicates how the NN filter model should be applied to sub-video units within the video unit or how the NN filter model index should be signaled for the sub-units.

Optionally, in any of the preceding aspects, another implementation of the aspect provides that the flag indicates whether all samples within the video unit share a same on and off control and indicates the NN filter model to apply to the samples.

A second aspect relates to an apparatus for coding video data comprising a processor and a non-transitory memory with instructions thereon, wherein the instructions upon execution by the processor cause the processor to: select a neural network (NN) filter model from a plurality of NN filter model candidates for each video unit, wherein the NN filter model selected for a first video unit is different than the NN filter model selected for a second video unit; and convert between a video media file and a bitstream based on the NN filter model selected for each video unit.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to: select a neural network (NN) filter model from a plurality of NN filter model candidates for each video unit wherein the NN filter model selected for a first video unit is different than the NN filter model selected for a second video unit; and convert between a video media file and a bitstream based on the NN filter model selected for each video unit.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of pixels involved in filter on/off decision and strong/weak filter selection.

DETAILED DESCRIPTION

Figure 1:
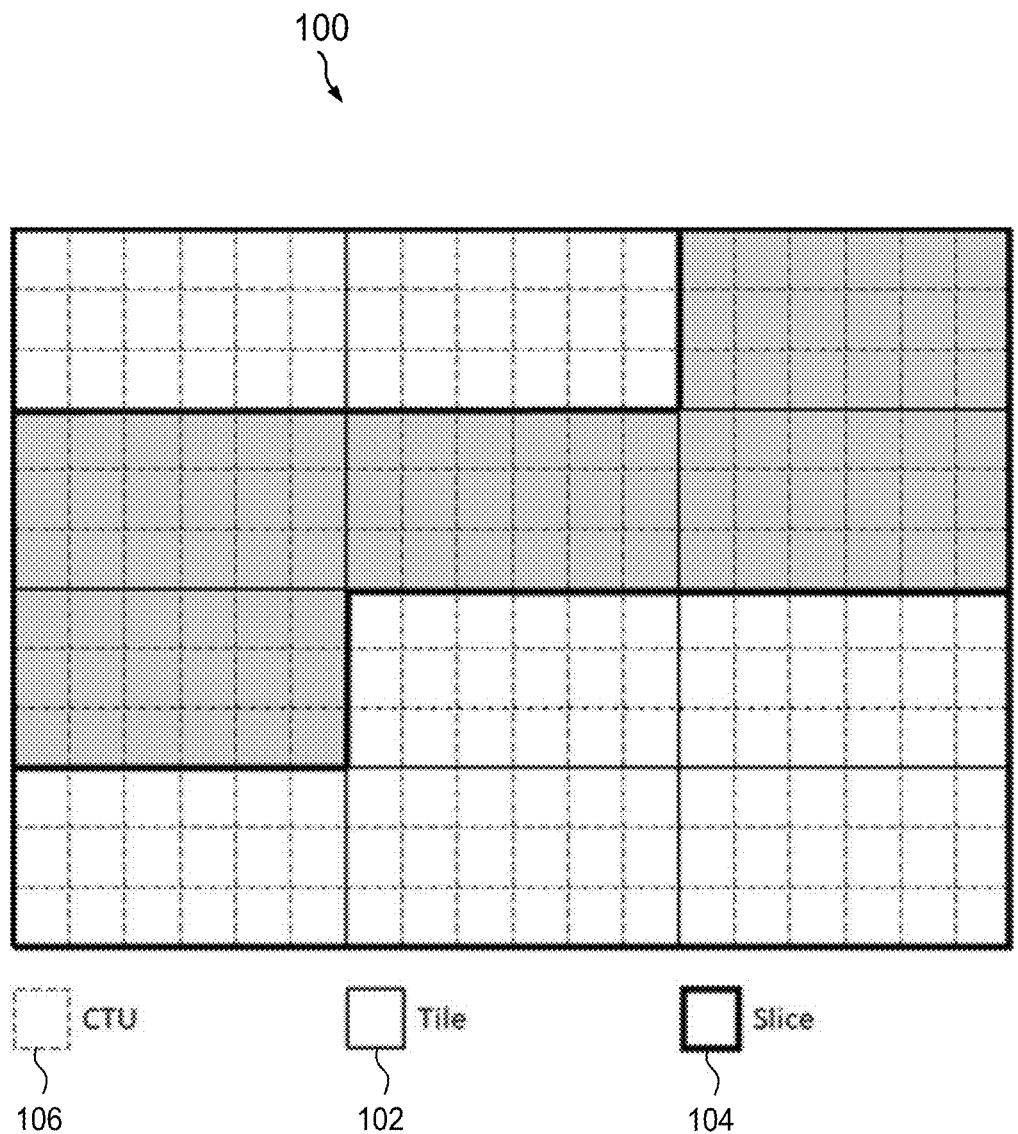
FIG. 1 is an example of raster-scan slice partitioning of a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for ease of understanding and not for limiting scope of the disclosed techniques. As such, the techniques described herein are applicable to other video codec protocols and designs also.

Video coding standards have evolved primarily through the development of the well-known International Telecommunication Union—Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4 chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/ JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 is an example of raster-scan slice partitioning of a picture 100, where the picture is divided into twelve tiles 102 and three raster-scan slices 104. As shown, each of the tiles 102 and slices 104 contains a number of CTUs 106.

Figure 2:
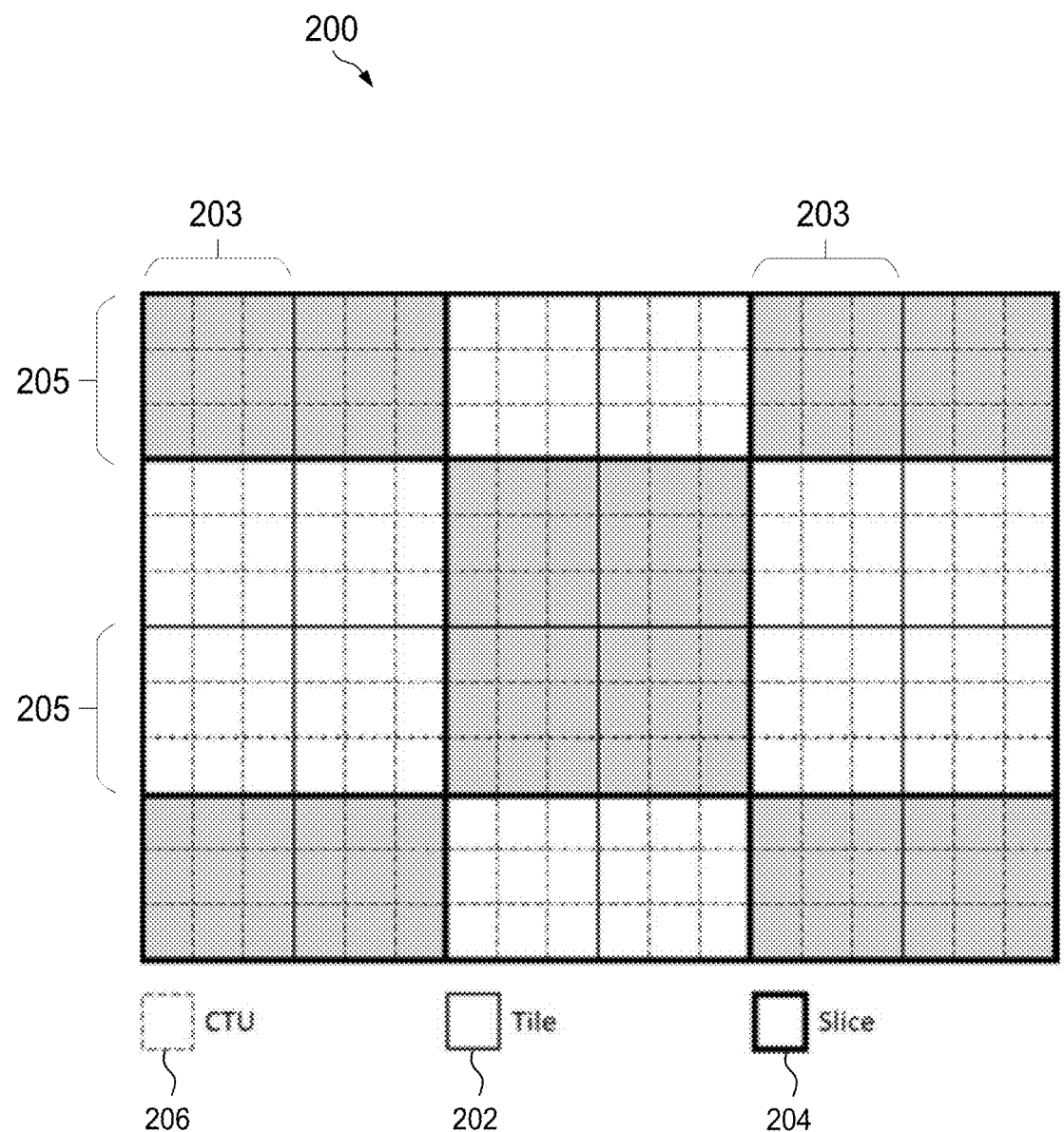
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and slices 204 contains a number of CTUs 206.

Figure 3:
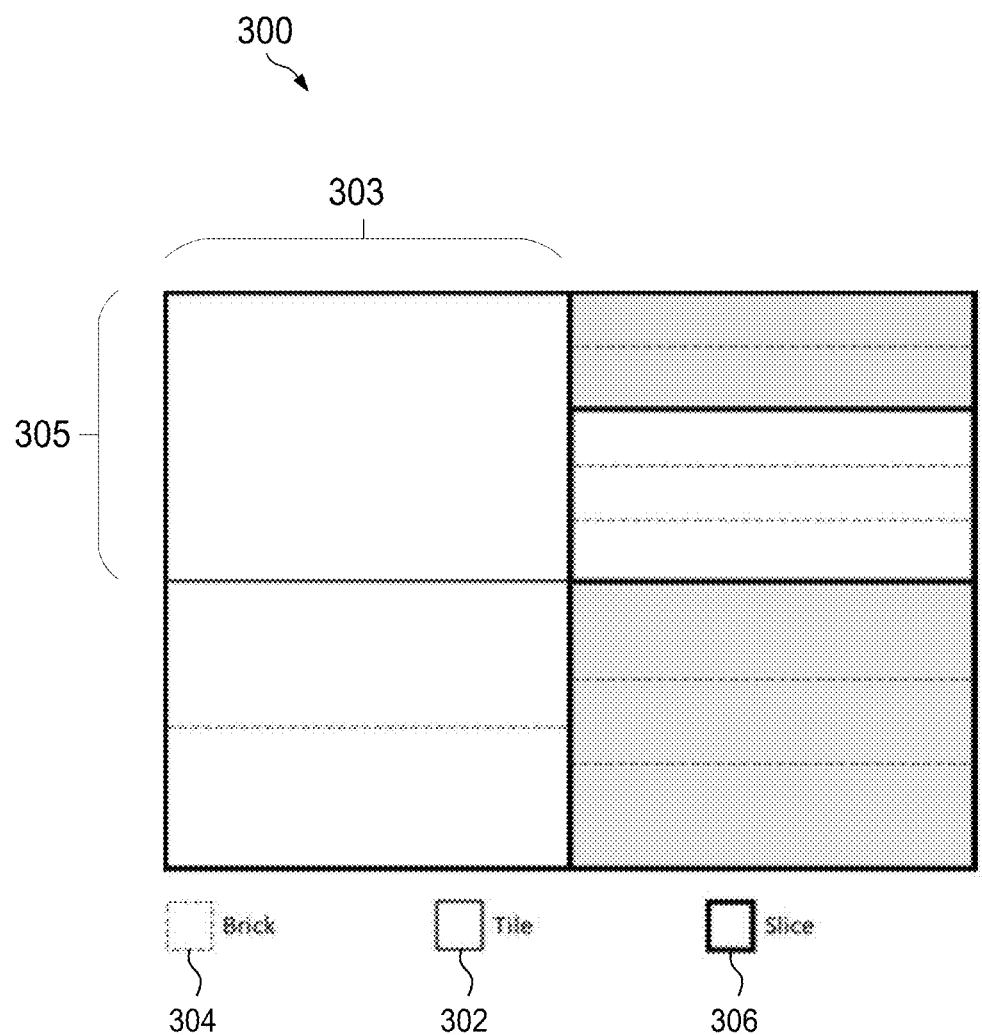
FIG. 3 is an example of a picture partitioned into tiles, bricks, and rectangular slices.

FIG. 3 is an example of a picture 300 partitioned into tiles, bricks, and rectangular slices according to the VVC specification, where the picture is divided into four tiles 302 (two tile columns 303 and two tile rows 305), eleven bricks 304 (the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. In VVC, the coding tree unit (CTU) size, which is signaled in a sequence parameter set (SPS) by the syntax element log2_ctu_size_minus2, could be as small as 4×4. The sequence parameter set raw byte sequence payload (RBSP) syntax is below.

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |

|  | Descriptor |
|---|---|
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| ... | |
| rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$CtbLog2SizeY = log2\_ctu\_size\_minus2 + 2 \qquad (7\text{-}9)$$

$$CtbSizeY = 1 << CtbLog2SizeY \qquad (7\text{-}10)$$

$$MinCbLog2SizeY = log2\_min\_luma\_coding\_block\_size\_minus2 + 2 \qquad (7\text{-}11)$$

$$MinCbSizeY = 1 << MinCbLog2SizeY \qquad (7\text{-}12)$$

$$MinTbLog2SizeY = 2 \qquad (7\text{-}13)$$

$$MaxTbLog2SizeY = 6 \qquad (7\text{-}14)$$

$$MinTbSizeY = 1 << MinTbLog2SizeY \qquad (7\text{-}15)$$

$$MaxTbSizeY = 1 << MaxTbLog2SizeY \qquad (7\text{-}16)$$

$$PicWidthInCtbsY = \text{Ceil}(pic\_width\_in\_luma\_samples \div CtbSizeY) \qquad (7\text{-}17)$$

$$PicHeightInCtbsY = \text{Ceil}(pic\_height\_in\_luma\_samples \div CtbSizeY) \qquad (7\text{-}18)$$

$$PicSizeInCtbsY = PicWidthInCtbsY * PicHeightInCtbsY \qquad (7\text{-}19)$$

$$PicWidthInMinCbsY = pic\_width\_in\_luma\_samples / MinCbSizeY \qquad (7\text{-}20)$$

$$PicHeightInMinCbsY = pic\_height\_in\_luma\_samples / MinCbSizeY \qquad (7\text{-}21)$$

$$PicSizeInMinCbsY = PicWidthInMinCbsY * PicHeightInMinCbsY \qquad (7\text{-}22)$$

$$PicSizeInSamplesY = pic\_width\_in\_luma\_samples * pic\_height\_in\_luma\_samples \qquad (7\text{-}23)$$

$$PicWidthInSamplesC = pic\_width\_in\_luma\_samples / SubWidthC \qquad (7\text{-}24)$$

$$PicHeightInSamplesC = pic\_height\_in\_luma\_samples / SubHeightC \qquad (7\text{-}25)$$

Figure 4A:
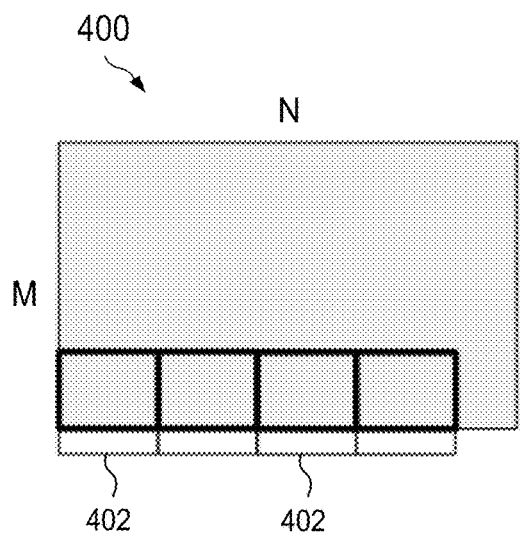
FIG. 4A is an example of coding tree blocks (CTBs) crossing the bottom picture border.
Figure 4B:
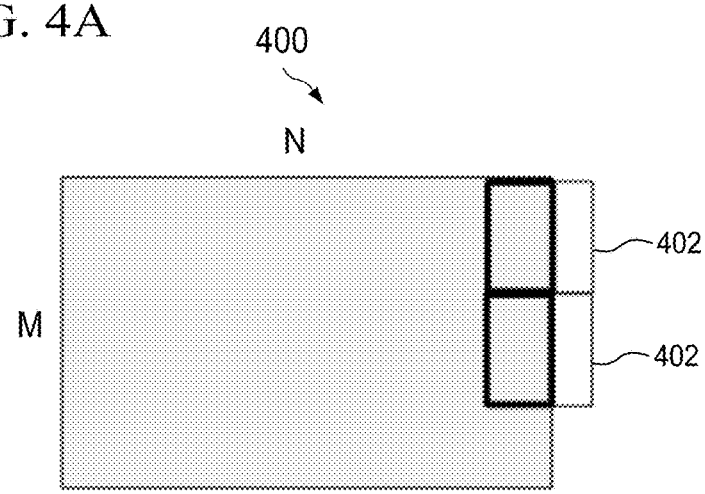
FIG. 4B is an example of CTBs crossing the right picture border and FIG. 4C is an example of CTBs crossing the right bottom picture border.
Figure 4C:
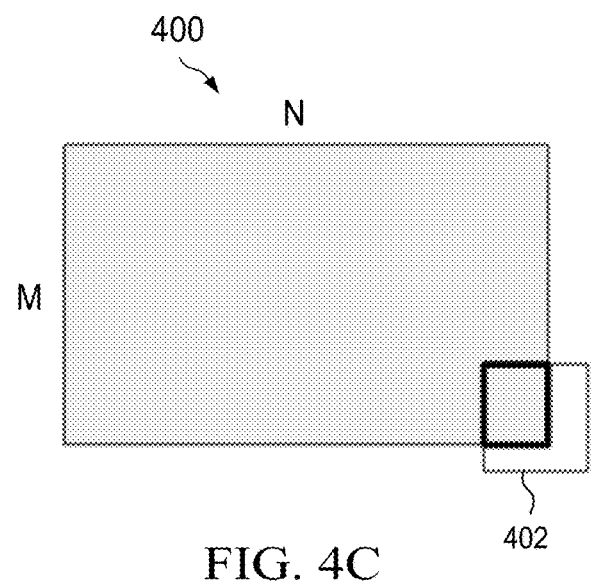

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs 402 as depicted in FIGS. 4A-4C, the CTB size is still equal to M×N, however, the bottom boundary/right boundary of the CTB is outside the picture 400.

Figure 5:
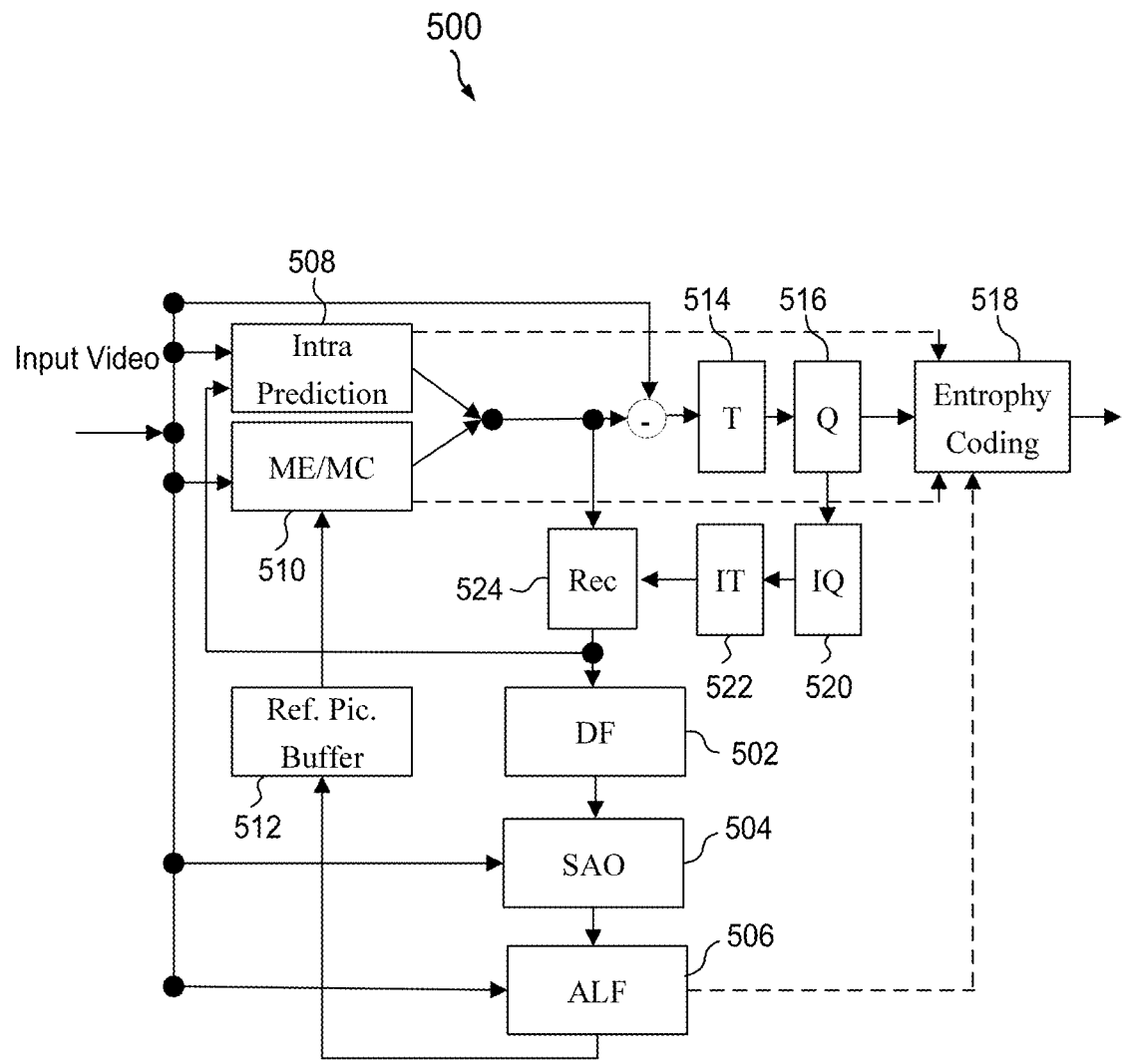
FIG. 5 is an example of encoder block diagram.

The coding flow of a typical video coder/decoder (a.k.a., codec) is discussed. FIG. 5 is an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) 504, and an ALF 506. Unlike the DF 502, which uses predefined filters, the SAO 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO 504, and the ALF 506 for filtering prior to those images being stored in the reference picture buffer 512.

The input of the DF 502 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
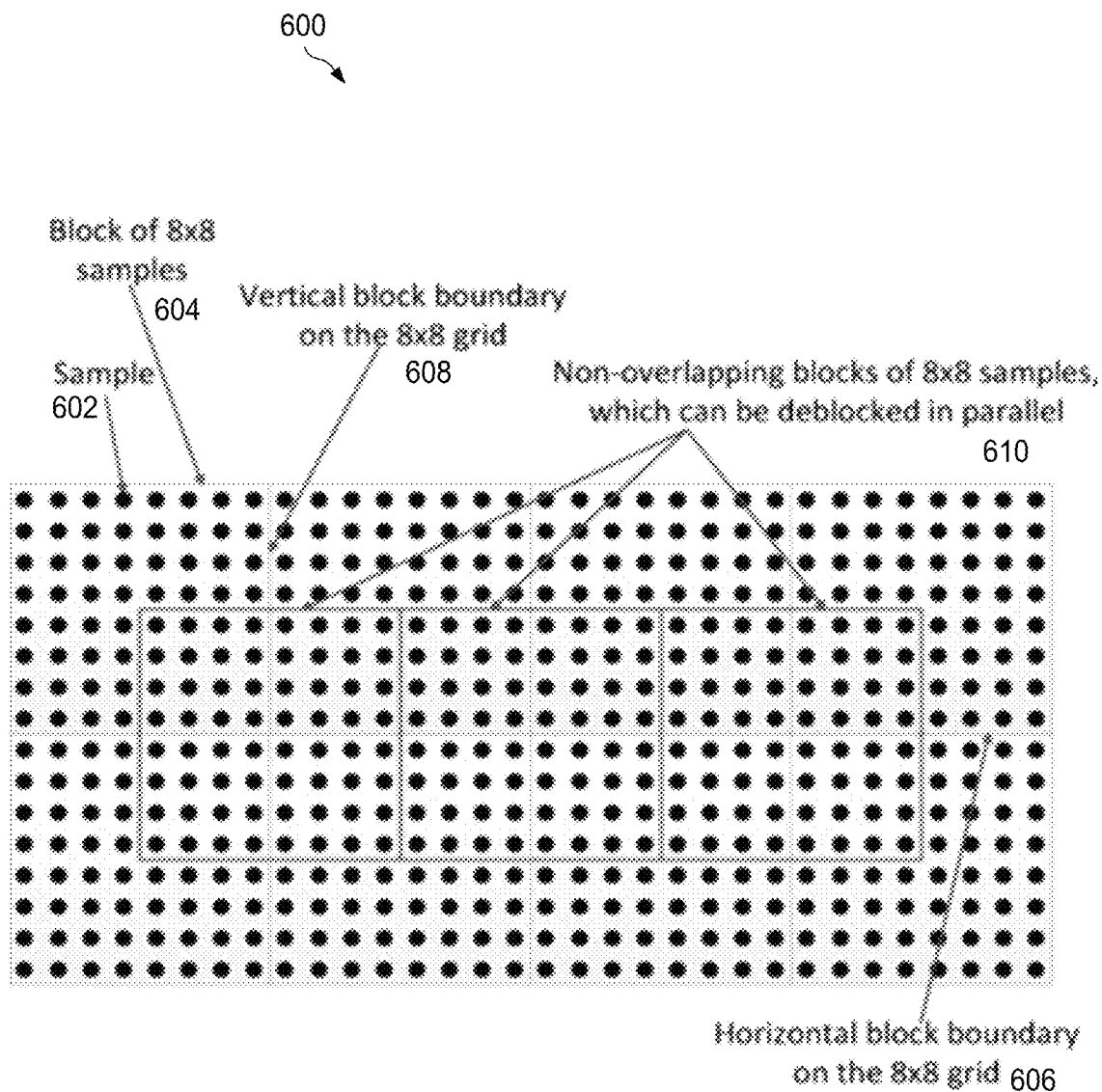
FIG. 6 is an illustration of samples within 8×8 blocks of samples.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of Affine motion prediction, Alternative temporal motion vector prediction (ATMVP)). For those which are not such boundaries, the filter is disabled.

The boundary strength calculation is discussed. For a transform block boundary/coding subblock boundary, if it is located in the 8×8 grid, the transform block boundary/coding subblock boundary may be filtered and the setting of bS[$xD_i$][$yD_j$] (wherein [$xD_i$][$yD_j$] denotes the coordinate) for this edge is defined in Table 1 and Table 2, respectively.

TABLE 1

Boundary strength (when SPS IBC is disabled)

| Priority | Conditions | Y | U | V |
| --- | --- | --- | --- | --- |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
| --- | --- | --- | --- | --- |
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |

TABLE 2-continued

Boundary strength (when SPS IBC is enabled)

| Priority | Conditions | Y | U | V |
|---|---|---|---|---|
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

Figure 7:
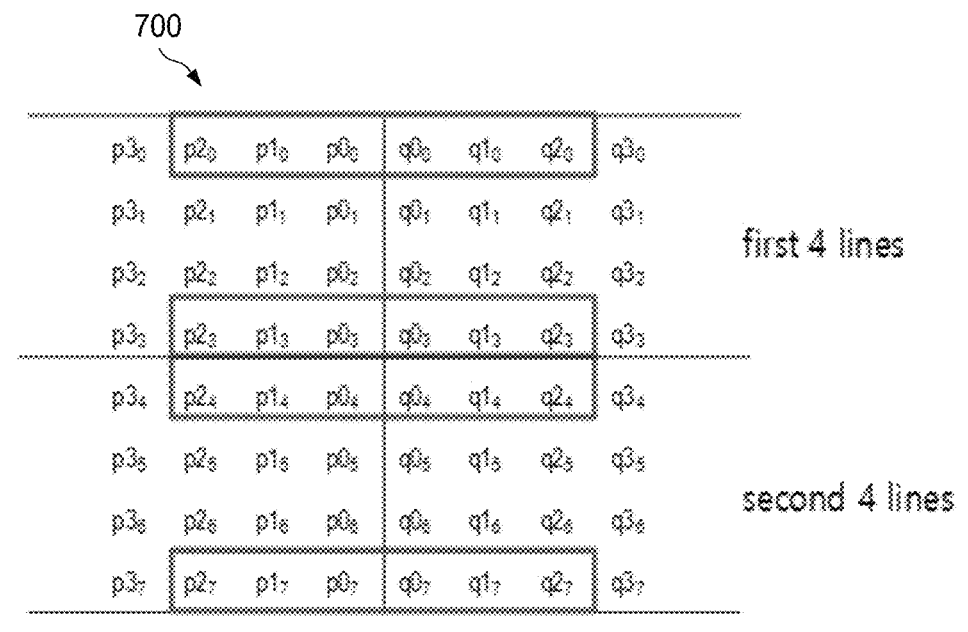

FIG. 7 is an example 700 of pixels involved in filter on/off decision and strong/weak filter selection. A wider-stronger luma filter is used only if all of the Condition 1, Condition 2, and Condition 3 are TRUE. The Condition 1 is the "large block condition." This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))?TRUE: FALSE bSideQisLargeBlk=((edge type is vertical and $q_0$ belongs to CU with width>=32)||(edge type is horizontal and $q_0$ belongs to CU with height>=32))?TRUE: FALSE Based on bSidePisLargeBlk and bSideQisLargeBlk, the Condition 1 is defined as follows.

Condition 1=(bSidePisLargeBlk||bSidePisLargeBlk)? TRUE: FALSE

Next, if Condition 1 is true, the Condition 2 will be further checked. First, the following variables are derived.

dp0, dp3, dq0, dq3 are first derived as in HEVC if (p side is greater than or equal to 32)

$dp0=(dp0+Abs(p5_0-2*p4_0+p3_0)+1)>>1$ $dp3=(dp3+Abs(p5_3-2*p4_3+p3_3)+1)>>1$ if ($q$ side is greater than or equal to 32)

$dq0=(dq0+Abs(q5_0-2*q4_0+q3_0)+1)>>1$ $dq3=(dq3+Abs(q5_3-2*q4_3+q3_3)+1)>>1$

Condition 2=(d<β)? TRUE:FALSE where d=dp0+dq0+dp3+dq3.

If Condition 1 and Condition 2 are valid, whether any of the blocks uses sub-blocks is further checked.

```
If (bSidePisLargeBlk)
{
 If (mode block P == SUBBLOCKMODE)
   Sp =5
 else
   Sp =7
}
else
 Sp = 3
If (bSideQisLargeBlk)
{
 If (mode block Q == SUBBLOCKMODE)
   Sq =5
```

-continued

```
 else
   Sq =7
}
else
 Sq = 3
```

Finally, if both the Condition 1 and Condition 2 are valid, the proposed deblocking method will check the condition 3 (the large block strong filter condition), which is defined as follows.

In the Condition 3 StrongFilterCondition, the following variables are derived.

```
dpq is derived as in HEVC.
sp_3 = Abs( p_3 - p_0 ), derived as in HEVC
if (p side is greater than or equal to 32)
 if(Sp==5)
   sp_3 = ( sp_3 + Abs( p_5 - p_3 ) + 1 ) >> 1
 else
   sp_3 = ( sp_3 + Abs( p_7 - p_3 ) + 1 ) >> 1
sq_3 = Abs( q_0 - q_3 ), derived as in HEVC
if (q side is greater than or equal to 32)
 If(Sq==5)
   sq_3 = ( sq_3 + Abs( q_5 - q_3 ) + 1 ) >> 1
 else
   sq_3 = ( sq_3 + Abs( q_7 - q_3 ) + 1 ) >> 1
```

As in HEVC, StrongFilterCondition=(dpq is less than (β>>2), $sp_3+sq_3$ is less than (3*β>>5), and Abs($p_0-q_0$) is less than (5*$t_C$+1)>>1)? TRUE:FALSE.

A stronger deblocking filter for luma (designed for larger blocks) is discussed.

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp−1 and $q_j$ for j=0 to Sq−1 (pi and qi are the i-th sample within a row for filtering vertical edge, or the i-th sample within a column for filtering horizontal edge) in HEVC deblocking described above) are then replaced by linear interpolation as follows.

$p_i'=(f_i*Middle_{s,t}+(64-f_i)*P_s+32)>>6)$, clipped to $p_i±tcPD_i$ $q_j'=(g_j*Middle_{s,t}+(64-g_j)*Q_s+32)>>6)$, clipped to $q_j±tcPD_i$ where $tcPD_i$ and $tcPD_j$ term is a position dependent clipping described in below and $g_j$, $f_i$, $Middle_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition: d is then derived as in HEVC luma deblocking. The second condition will be TRUE when d is less than $\beta$.

In the third condition StrongFilterCondition is derived as follows.

$sp_3 = \text{Abs}(p_3 - p_0)$, derived as in HEVC $sq_3 = \text{Abs}(q_0 - q_3)$, derived as in HEVC As in HEVC design, StrongFilterCondition=(dpq is less than ($\beta$>>2), $sp_3 + sq_3$ is less than ($\beta$>>3), and $\text{Abs}(p_0 - q_0)$ is less than $(5*t_C + 1) >> 1$).

A strong deblocking filter for chroma is discussed. The following strong deblocking filter for chroma is defined.

$p_2' = (3*p_3 + 2*p_2 + p_1 + p_0 + q_0 + 4) >> 3$ $p_1' = (2*p_3 + p_2 + 2*p_1 + p_0 + q_0 + q_1 + 4) >> 3$ $p_0' = (p_3 + p_2 + p_1 + 2*p_0 + q_0 + q_1 + q_2 + 4) >> 3$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in the boundary strength calculation, position dependent threshold table is selected from two tables (i.e., Tc7 and Tc3 tabulated below) that are provided to decoder as a side information.

$Tc7 = \{6, 5, 4, 3, 2, 1, 1\}; Tc3 = \{6, 4, 2\};$ $tcPD = (Sp==3)?Tc3:Tc7;$ $tcQD = (Sq==3)?Tc3:Tc7;$

For the P or Q boundaries being filtered with a short symmetrical filter, position dependent threshold of lower magnitude is applied.

$Tc3 = \{3, 2, 1\};$

Following defining the threshold, filtered $p'_i$ and $q'_i$ sample values are clipped according to tcP and tcQ clipping values.

$p''_i = \text{Clip3}(p'_i + tcP_i, p'_i - tcP_i, p'_i);$ $q''_j = \text{Clip3}(q'_j + tcQ_j, q'_j - tcQ_j, q'_j);$ where $p'_i$ and $q'_i$ are filtered sample values, $p''_i$ and $q''_j$ are output sample value after the clipping and $tcP_i$ $tcP_i$ are clipping thresholds that are derived from the VVC tc parameter and tcPD and tcQD. The function Clip3 is a clipping function as it is specified in VVC. Sub-block deblocking adjustment is discussed.

To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that that sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength - 2) || edge == (56 / 4) || edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary, etc. Where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 8:
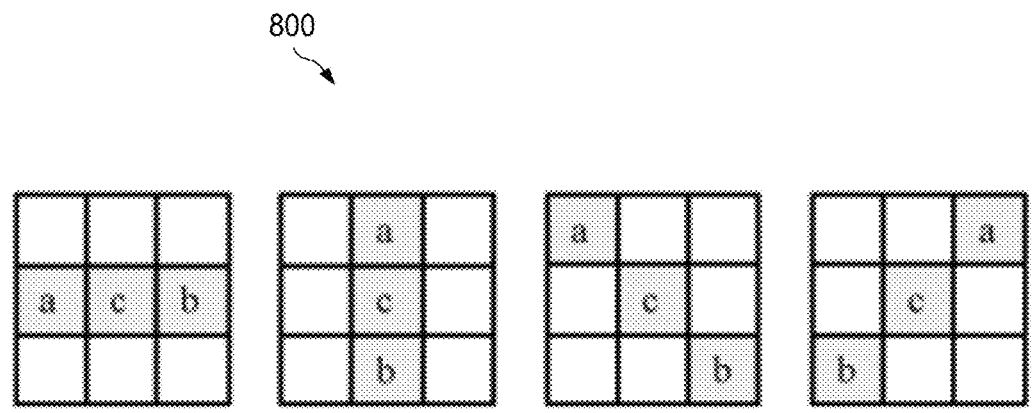
FIG. 8 shows four one dimensional (1-D) directional patterns for EO sample classification.

FIG. 8 shows four one dimensional (1-D) directional patterns 800 for EO sample classification: horizontal (EO class=0), vertical (EO class=1), 135° diagonal (EO class=2), and 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | ( c < a && c == b) \|\| (c == a && c < b) |
| 3 | ( c > a && c == b) \|\| (c == a && c > b) |
| 4 | c > a && c > b |
| 5 | None of above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2×2 block, based on the direction and activity of local gradients.

Figure 9:
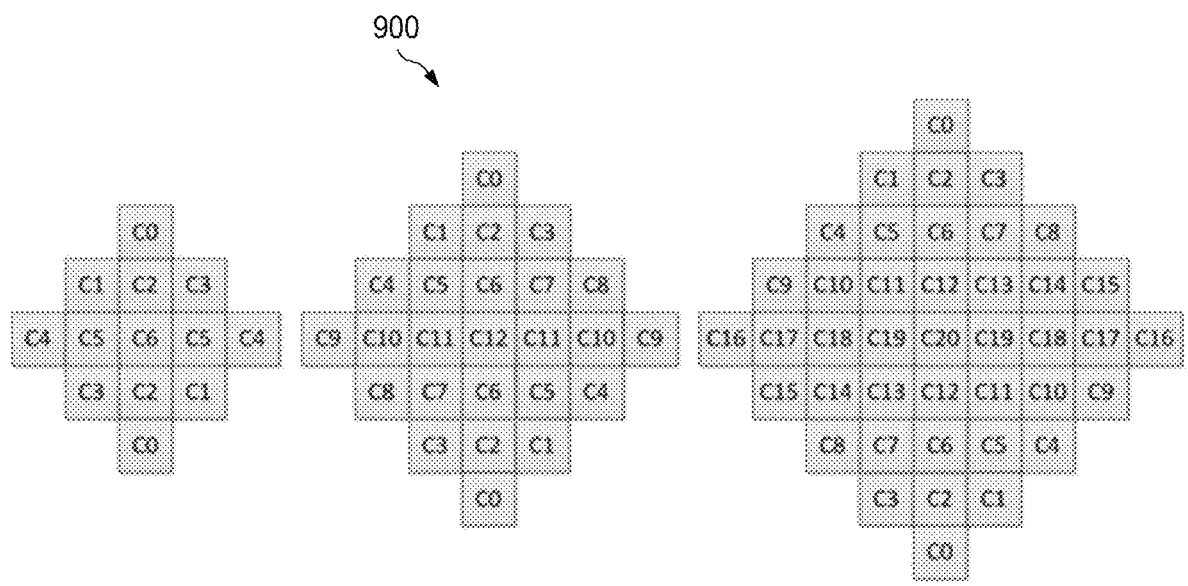
FIG. 9 shows examples of geometry transformation-based adaptive loop filter (GALF) filter shapes.

The filter shape is discussed. FIG. 9 shows examples of GALF filter shapes 900, including on the left a 5×5 diamond, in the middle a 7×7 diamond, and one the right a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity $\hat{A}$, as follows.

$$C = 5D + \hat{A}. \quad (1)$$

To calculate D and $\hat{A}$, gradients of the horizontal, vertical and two diagonal direction are first calculated using 1-D Laplacian.

$$g_v = \sum_{k=i-2}^{i+3} \sum_{l=j-2}^{j+3} V_{k,l}, \quad V_{k,l} = |2R(k, l) - R(k, l-1) - R(k, l+1)|, \quad (2)$$

$$g_h = \sum_{k=i-2}^{i+3} \sum_{l=j-2}^{j+3} H_{k,l}, \quad H_{k,l} = |2R(k, l) - R(k-1, l) - R(k+1, l)|, \quad (3)$$

$$g_{d1} = \sum_{k=i-2}^{i+3} \sum_{l=j-3}^{j+3} D1_{k,l}, \quad (4)$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \quad (5)$$

$$D2_{k,l} = |2R(k, l) - R(k-1, l+1) - R(k+1, l-1)|$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), \quad g_{h,v}^{min} = \min(g_h, g_v), \quad (6)$$

$$g_{h,v}^{max} = \max(g_h, g_v), \quad g_{h,v}^{min} = \min(g_h, g_v), \quad (1)$$

and the maximum and minimum values of the gradient of two diagonal directions are set as:

$$g_{d0,d1}^{max} = \max(g_{d0}, g_{d1}), \quad g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as $\hat{A}$.

For both chroma components in a picture, no classification method is applied, i.e. a single set of ALF coefficients is applied for each chroma component.

Geometric transformation of filter coefficients is discussed.

Figure 10:
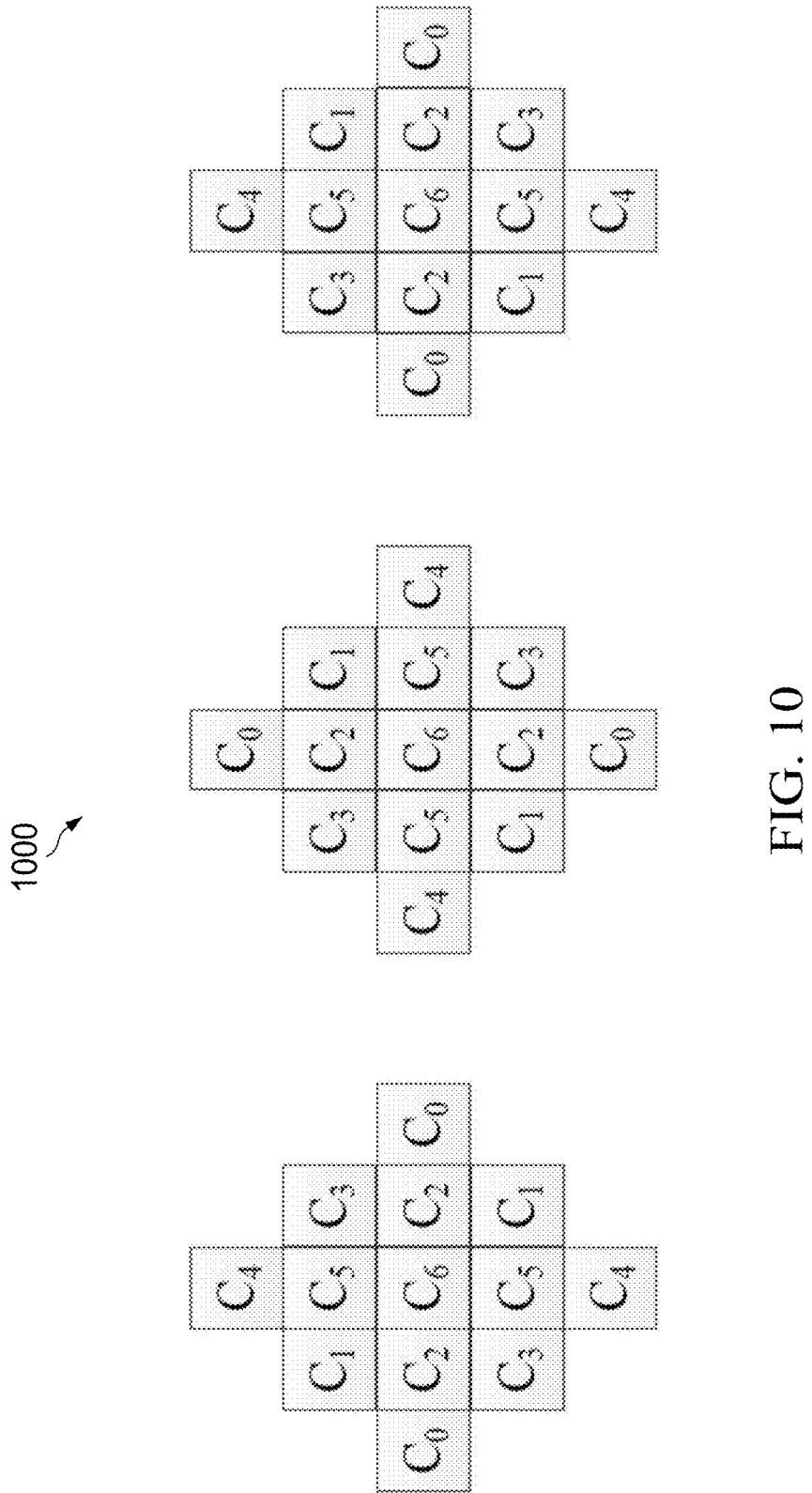
FIG. 10 shows a relative coordinates for the 5×5 diamond filter support.

FIG. 10 shows a relative coordinates 1000 for the 5×5 diamond filter support—diagonal, vertical flip, and rotation, respectively (from left to right).

Before filtering each 2×2 block, geometric transformations such as rotation or diagonal and vertical flipping are applied to the filter coefficients f(k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

Diagonal: $f_D(k, l)=f(l, k)$,

Vertical flip: $f_V(k, l)=f(k, K-l-1)$,

Rotation: $f_R(k, l)=f(K-l-1,k)$. (9)

where K is the size of the filter and $0 \le k, l \le K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 4.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can be controlled at the CU level. A flag is signalled to indicate whether GALF is applied to the luma component of a CU. For chroma component, whether GALF is applied or not is indicated at picture level only.

The filtering process is discussed. At the decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i, j)=\Sigma_{k=-L/2}^{L/2}\Sigma_{l=-L/2}^{L/2} f(k, l) \times R(i+k, j+l) \quad (2)$$

Figure 11:
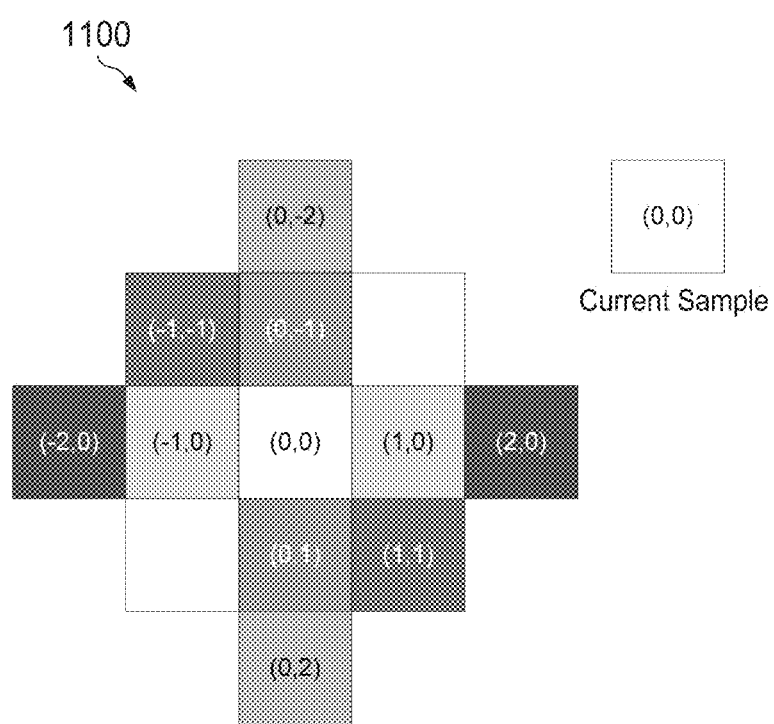
FIG. 11 shows an example of relative coordinates used for 5×5 diamond filter support.

FIG. 11 shows an example of relative coordinates used for 5×5 diamond filter support supposing the current sample's coordinate (i, j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the Adaptive Loop Filter, is performed as follows:

$$O(x,y)=\Sigma_{(i,j)}w(i,j).I(x+i, y+j), \quad (11)$$

where samples I(x+i, y+j) are input samples, O(x, y) is the filtered output sample (i.e., filter result), and w(i,j) denotes the filter coefficients. In practice, in VTM4.0 it is implemented using integer arithmetic for fixed point precision computations $$O(x, y) = \left( \sum_{i=-\frac{L}{2}}^{\frac{L}{2}} \sum_{j=-\frac{L}{2}}^{\frac{L}{2}} w(i, j).I(x + i, y + j) + 64 \right) \gg 7, \quad (12)$$

where L denotes the filter length, and where w(i,j) are the filter coefficients in fixed point precision.

The current design of GALF in VVC has the following major changes compared to that in JEM:
1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x, y)=I(x, y)+\Sigma_{(i,j)\ne(0,0)}w(i,j).(I(x+i, y+j)-I(x, y)), \quad (3)$$

where w(i,j) are the same filter coefficients as in equation (11) [excepted w(0, 0) which is equal to 1 in equation (13) while it is equal to $1-\Sigma_{(i,j)\ne(0,0)}w(i,j)$ in equation (11)].

Using this above filter formula of (13), VVC introduces the non-linearity to make ALF more efficient by using a simple clipping function to reduce the impact of neighbor sample values (I(x+i, y+j)) when they are too different with the current sample value (I(x, y)) being filtered.

More specifically, the ALF filter is modified as follows:

$$O'(x,y)=I(x,y)+\Sigma_{(i,j)\neq(0,0)}w(i,j).K(I(x+i, y+j)-I(x,y), k(i,j)), \quad (14)$$

where K(d, b)=min(b, max(-b, d)) is the clipping function, and k(i,j) are clipping parameters, which depends on the (i,j) filter coefficient. The encoder performs the optimization to find the best k(i,j).

In the JVET-N0242 implementation, the clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left(\left((M)^{\frac{1}{N}}\right)^{N-n+1}\right) \text{ for } n \in 1 \ldots N]\right\}, \quad (15)$$

with $M = 2^{10}$ and $N = 4$.

Similarly, the Chroma tables of clipping values is obtained according to the following formula:

$$AlfClip_C = \left\{ \text{round}\left(A.\left(\frac{M}{A}\right)^{\frac{1}{N-1}}\right)^{N-n}\right) \text{ for } n \in 1 \ldots N]\right\}, \quad (16)$$

with $M = 2^{10}$, $N = 4$ and $A = 4$.

TABLE 5

Authorized clipping values

|  | INTRA/INTER tile group |
|---|---|
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 5. This encoding scheme is the same as the encoding scheme for the filter index.

Convolutional Neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications: end-to-end compression purely based on neural networks and traditional frameworks enhanced by neural networks. End-to-end compression purely based on neural networks are discussed in Johannes Ballé, Valero Laparra, and Eero P. Simoncelli, "End-to-end optimization of nonlinear transform codes for perceptual quality," In: 2016 Picture Coding Symposium (PCS), pp. 1-5, Institute of Electrical and Electronics Engineers (IEEE) and Lucas Theis, Wenzhe Shi, Andrew Cunningham, and Ferenc Huszár, "Lossy image compression with compressive autoencoders," arXiv preprint arXiv:1703.00395 (2017). Traditional frameworks enhanced by neural networks Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for the intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g. HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 12A:
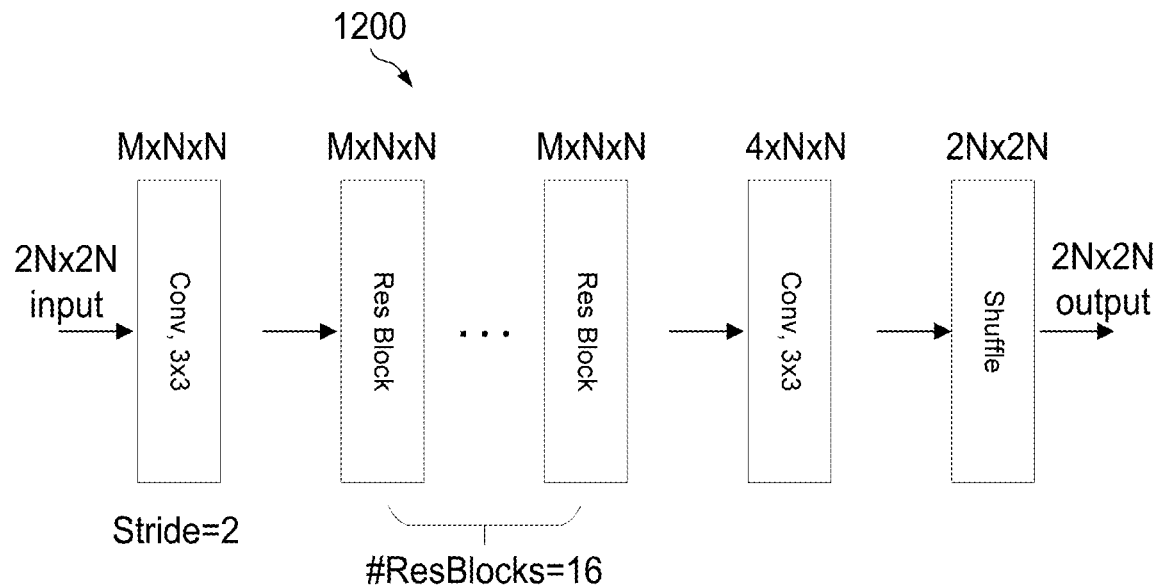
FIG. 12A is an example architecture of the proposed CNN filter.
Figure 12B:
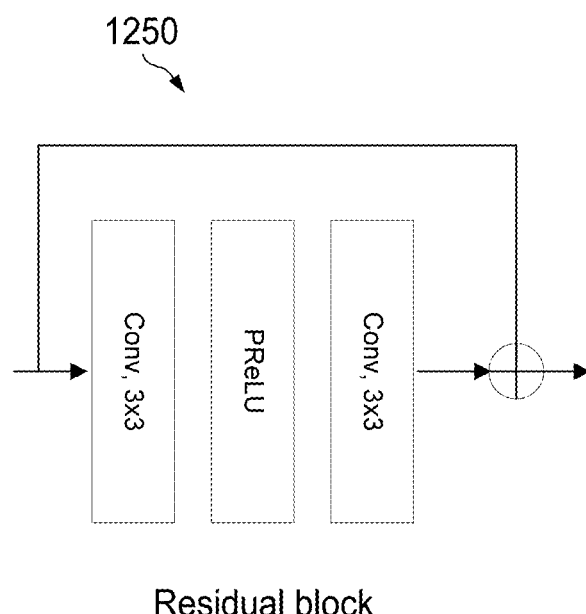
FIG. 12B is an example of construction of residual block (ResBlock).

FIG. 12A is an example architecture 1200 of the proposed CNN filter, and FIG. 12B is an example of construction 1250 of residual block (ResBlock). In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has the following problems. First, samples with different characteristics in a slice are processed by a single CNN model. Second, samples in different temporal layers are processed by a single CNN model. Third, a CNN model used in different temporal layers has the same structure.

Disclosed herein are techniques that solve one or more of the foregoing problems. For example, the present disclosure provides one or more neural network (NN) filter models trained as part of an in-loop filtering technology or filtering technology used in a post-processing stage for reducing the distortion incurred during compression. In addition, samples with different characteristics are processed by different NN filter models. The present disclosure also elaborates how to design multiple NN filter models, how to select from multiple NN filter models, and how to signal the selected NN filter index.

Video coding is a lossy process. Convolutional Neural Networks (CNN) can be trained to recover detail lost in the compression process. That is, artificial intelligence (AI) processes can create CNN filters based on training data.

Different CNN filters work best for different situations. The encoder and the decoder have access to a plurality of CNN filters that have been trained ahead of time (a.k.a., pre-trained). The present disclosure describes methods and techniques to allow the encoder to signal to the decoder which CNN filter to use for each video unit. The video unit may be a sequence of pictures, a picture, a slice, a tile, a brick, a sub-picture, a coding tree unit (CTU), a CTU row, a coding unit (CU), etc. As an example, different CNN filters can be used for different layers, different components (e.g., luma, chroma, Cb, Cr, etc.), different specific video units, etc. Flags and/or indices can be signaled to indicate which CNN filter should be used for each video item. The CNN filters can be signaled based on whether a neighbor video unit uses the filter. Inheritance of CNN filters between parent and child nodes when trees are used to partition video units is also provided.

The listing of embodiments below should be considered as examples to explain general concepts. These embodiments should not be interpreted in a narrow way. Furthermore, these embodiments can be combined in any manner.

In the disclosure, a NN filter can be any kind of NN filter, such as a convolutional neural network (CNN) filter. In the following discussion, an NN filter may also be referred to as a CNN filter.

In the following discussion, a video unit may be a sequence, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), a sub-region within a picture/slice/tile/brick. A father video unit represents a unit larger than the video unit. Typically, a father unit will contain several video units, for example, when the video unit is CTU, the father unit could be slice, CTU row, multiple CTUs, etc.

A discussion of the model selection is provided.

Example 1

In a first embodiment, an NN filter model can be selected from multiple NN filter model candidates for a video unit.

a. In one example, the model selection is performed at the video unit level (e.g., in a CTU level). For the given video unit (e.g., a CTU), the NN filter model index is first derived. Given the model index, the given video unit (e.g., CTU) will be processed by the corresponding selected NN filter model.

b. Alternatively, for a video unit, multiple candidates may be selected and/or signaled.

c. In one example, the luma and chroma components in video unit may use different sets of NN filter model candidates.

i. In one example, the same number of NN filter model candidates are allowed for the luma and chroma components, but the filter model candidates are different for the luma and chroma components.

ii. For example, there may be L NN filter model candidates for luma component and C NN filter model candidates for chroma, where L is not equal to C, e.g. L>C.

iii. In one example, the chroma components (such as Cb and Cr or U and V) in a video unit may share the same NN filter model candidates.

d. In one example, the number of NN filter model candidates may be signaled to the decoder.

e. In one example, the NN filter model candidates may be different for different video units (e.g., sequences/pictures/slices/tiles/bricks/subpictures/CTUs/CTU rows/CUs).

f. In one example, the NN filter model candidates may be dependent on the tree partition structure (e.g., dual tree or single tree).

Example 2

In a second embodiment, indicators of one or several NN filter model indices may be signaled for a video unit.

a. In one example, the indicator is the NN filter model index. i. Alternatively, more than one syntax elements may be signaled or derived to represent one NN filter model index. 1) In one example, a first syntax element may be signaled to indicate whether the index is no greater than $K_0$ (e.g., $K_0=0$). a. Alternatively, furthermore, a second syntax element may be signaled to indicate whether the index is no greater than $K_0$ (e.g., $K_1=1$). b. Alternatively, furthermore, a second syntax element may be signaled to indicate whether the index minus $K_0$.

b. In one example, an index corresponds to a NN filter model candidate. c. In one example, different color components (including luma and chroma) in a video unit may share the same one or multiple signaled NN filter model index. (i) Alternatively, a filter index is signaled for each color component in a video unit. (ii) Alternatively, a first filter index is signaled for the first color component (such as luma) and a second filter index is signaled for the second and the third color components (such as Cb and Cr, or U and V). (iii) Alternatively, an indicator (e.g., a flag) is signaled to indicate if all color components will share the same NN filter model index. 1) In one example, when the flag is true, one CNN filter model index is signaled for the video unit. Otherwise, filter index is signaled according to the above bullet i or bullet ii. (iv) Alternatively, an indicator (e.g., a flag) is signaled to indicate if two components (e.g. the second and the third color components, or Cb and Cr, or U and V) will share the same NN filter model index. 1) In one example, when the flag is true, one CNN filter model index is signaled for the two components. Otherwise, an individual filter index will be signaled for each of the two components.

v. Alternatively, an indicator (e.g., a flag) is signaled to indicate if NN filter will be used for the current video unit. 1) In one example, if the flag is false, current video unit will not be processed by the NN filter, meaning no transmission of any NN filter model index. Otherwise, NN filter model index is signaled according to the above bullet i, or bullet ii or bullet iii or bullet iv.

vi. Alternatively, an indicator (e.g., a flag) is signaled to indicate if NN filter will be used for the two components in current video unit (e.g. the second and the third color components, or Cb and Cr, or U and V). 1) In one example, if the flag is false, the two components will not be processed by the NN filter, meaning no transmission of any NN filter model index for the two components. Otherwise, NN filter model index is signaled according to the above bullet i, or bullet ii or bullet iii or bullet iv.

vii. The indicator may be coded with one or more contexts in arithmetic coding. 1) In one example, the indicator of the index may be binarized to a bin string, and at least one bin may be coded with one or more contexts. 2) Alternatively, the indicator of the index may be firstly binarized to a bin string, and at least one bin may be coded with bypass mode. 3) The context may be derived from coding information of the current unit and/or neighboring units.

viii. In above examples, a specific value of the indicator (e.g., being equal to 0) may be further used to indicate whether the NN filter is applied or not.

ix. The indicator may be binarized with a fixed length code, or a unary code, or a truncated unary code, or an Exponential-Golomb code (e.g., K-th EG code, wherein K=0), or a truncated Exponential-Golomb code.

x. The indicator may be binarized based on coding information of current and/or neighboring blocks (such as quantization parameters (QPs)). 1) In one example, denote the QP of current video unit as q, then K CNN filter models are trained corresponding to $q_1, q_2, \ldots q_K$ respectively, where $q_1, q_2 \ldots q_K$ are K different QPs. a. Alternatively, furthermore, a shorter code length is assigned to the index corresponding to the model based on $q_i=q$. b. Alternatively, furthermore, a shorter code length is assigned to the index corresponding to the model based on $q_i$ wherein $abs(q_i-q)$ is the smallest one compared to other $q_j$. 2) In one example, denote the QP of current video unit as q, then three CNN filter models are trained corresponding to $q_1, q, q_2$ respectively, where $q_1<q<q_2$. Then a first flag is signaled to indicate if the model corresponding to QP=q is used. If the flag is false, a second flag is signaled to indicate if the model corresponding the QP=$q_1$ is used. If the second flag is still false, a third flag is further signaled to indicate if the model corresponding to the QP=$q_2$ is used.

d. In one example, NN filter model indices may be coded in a predictive way. i. For example, a previously coded/decoded NN filter model index may be used as a prediction for the current NN filter model index. 1) A flag may be signaled to indicate whether the current NN filter model index is equal to the previously coded/decoded NN filter model index.

e. In one example, indicators of one or several NN filter model indices in current video unit may be inherited from previously coded/neighboring video units. i. In one example, NN filter model indices of current video unit may be inherited from previously coded/neighboring video units. 1) In one example, denote the number of previously coded/neighboring video unit candidates as C. An inheritance index (range from 0 to C−1) is then signaled for current video unit to indicate the candidate to be inherited. ii. In one example, NN filter on/off control of current video unit may be inherited from previously coded/neighboring video units.

f. In above examples, the signaled indicator may further represent whether the NN filtering method is applied or not. i. In one example, suppose M filter models are allowed for a video unit, the indicator may be signaled in the following way.

| Index to be coded | $0^{th}$ Bin | $1^{st}$ bin | $2^{nd}$ bin | ...-th Bin | M-th Bin | meaning |
|---|---|---|---|---|---|---|
| 0 | 0 | | | | | Enabled |
| 1 | 1 | 0 | | | | with the k-th |
| 2 | 1 | 1 | 0 | | | model in the |
| ... | 1 | 1 | 1 | ... | | allowed |
| M – 1 | 1 | 1 | 1 | ... | 0 | models |
| | | | | | | (k = 0 ... M – 1) |
| M | 1 | 1 | 1 | ... | 1 | disabled |

1) Alternatively, the '0' and '1' value for the k-th bin in the above table may be exchanged.

ii. Alternatively, suppose M filter models are allowed for a video unit, the indicator may be signaled in the following way.

| Index to be coded | $0^{th}$ Bin | $1^{st}$ bin | $2^{nd}$ bin | ...-th Bin | M-th Bin | meaning |
|---|---|---|---|---|---|---|
| 0 | 0 | | | | | Disabled |
| 1 | 1 | 0 | | | | Enabled with |
| 2 | 1 | 1 | 0 | | | the k-th |
| ... | 1 | 1 | 1 | ... | | model in the |
| M – 1 | 1 | 1 | 1 | ... | 0 | allowed |
| M | 1 | 1 | 1 | ... | 1 | models |
| | | | | | | (k = 1 ... M) | g. In above examples, a same value of the indicator for two video units may represent different filter model which are used to be applied to the two video units. i. In one example, how to select a filter model for a video unit may depend on the decoded value of the indicator and the characteristics (e.g., QP/prediction mode/other coded information) of the video unit.

Example 3

3. In a third embodiment, one or several NN filter model indices and/or on/off control may be derived for a unit in the same way for the encoder and decoder. a. The derivation may depend on coding information of the current unit and/or neighboring units. i. The coding information includes QP.

Example 4

In a fourth embodiment, indicators of multiple NN filter model indices may be signalled for one video unit, and the selection of the index for a sub-region within the one video unit may be further determined on-the-fly. a. In one example, indicators of a first set of NN filter models may be signalled in a first level (e.g., a picture/slice), and indicators of an index within the first set may be further signalled or derived in a second level (wherein the number of samples in the second level is smaller than that in the first level). i. In one example, the second level is a CTU/CTB level. ii. In one example, the second level is a fixed M×N region.

Example 5

In a fifth embodiment, a syntax element (e.g., a flag) may be signalled/derived to indicate whether NN filter is enabled or disabled for the video unit. a. In one example, the syntax element may be context coded or bypass coded. i. In one example, one context is utilized to code the syntax element. ii. In one example, multiple contexts may be utilized, e.g., the selection of context may depend on the values of the syntax elements associated with neighboring blocks. b. In one example, it may be signalled in multiple levels (e.g., in picture and slice levels; in slice and CTB/CTU levels). i. Alternatively, furthermore, whether to signal the syntax element in a second level (e.g., CTB/CTU) may be based on the value of the syntax element in a first level (e.g., slice).

Example 6

In a sixth embodiment, indicators of multiple NN filter model indices may be conditionally signalled. a. In one example, whether to signal the indicators may depend on whether NN filter is enabled for the video unit. i. Alternatively, furthermore, signalling of the indicators is skipped when the NN filter is disabled for the video unit.

Example 7

In a seventh embodiment, a first indicator may be signaled in a father unit to indicate how NN filter model index will be signaled for each video unit contained in the father unit, or how NN filter will be used for each video unit contained in the father unit. a. In one example, the first indicator may be used to indicate whether all samples within the father unit share the same on/off control. i. Alternatively, furthermore, a second indicator of a video unit within the father unit to indicate the usage of NN filter may be conditionally signaled based on the first indicator.

b. In one example, the first indicator may be used to indicate which model index is used for all samples within the father unit. i. Alternatively, furthermore, a second indicator of a video unit within the father unit to indicate the usage of NN filter may be further signaled if the first indicator represents a given model index is utilized. ii. Alternatively, furthermore, a second indicator of a video unit within the father unit to indicate the usage of NN filter may be skipped if the first indicator represents a given model index is utilized.

c. In one example, the first indicator may be used to indicate whether to further signal indices of a video unit within the father unit. d. In one example, the indicator may have K+2 options, where K is number of NN filter model candidates. i. In one example, when the indicator is 0, NN filter is disabled for all the video units contained in the father unit. ii. In one example, when the indicator is i (1≤i≤K), the $i^{th}$ NN filter model will be used for all the video units contained in the father unit. Obviously, for the K+1 options just mentioned, it is not necessary to signal any NN filter model index for any video units contained in the father unit. 1) Alternatively, information of on/off control for a video unit is still signaled, and when it is on, the $i^{th}$ NN filter model is used. iii. In one example, when the indicator is K+1, NN filter model index (e.g., filter index, and/or on/off control) will be signaled for each video unit contained in the father unit.

A discussion of the derivation of multiple CNN filter models for a video unit is provided.

Example 8

In an eighth embodiment, for different reconstructed quality level, different CNN filter model candidates may be used. a. In one example, for each reconstructed quality level, pretrained CNN filter model candidates are used. b. In one example, video quality level is inferred from the quantization parameter (QP). In one example, denote the QP of current video unit as q, and K (e.g., K=3) sets of CNN filter models are trained corresponding to $q_1, q_2, \ldots q_K$ respectively, where $q_1, q_2, \ldots q_K$ are three different QPs around q. Current video unit will be processed by one of K sets.

1) In one example, at least of the $q_1, q_2, \ldots q_K$ is smaller than q. 2) In one example, at least of the $q_1, q_2, \ldots q_K$ is greater than q. 3) In one example, selection of the one of K sets may be determined by q and $\{q_1, q_2, \ldots q_K\}$. a. In one example, the set corresponding to $q_i$ which gives the smallest differences with q will be chosen.

4) Alternatively, more than one set may be allowed to process the current video unit. a. In one example, filter models from the more than one set may be allowed to be selected and indicators of the index to the more than one sets may be signaled. b. In one example, an indicator of a selected set index corresponding to the more than one set may be signaled. i. Alternatively, furthermore, the indictor of a filter model index within the selected set index may be further signaled. 1. How to signal or whether to signal the indictor of the filter model index may depend on the number of filter models within the selected set index.

Example 9

In a ninth embodiment, multiple CNN filter model candidates may have different structures. a. In one example, different CNN filter model candidates may be with different network-sizes. i. In one example, the network-size are controlled by the number of layers. ii. In one example, the network-size are controlled by the number of feature maps. iii. In one example, the network-size are controlled by the resolution of intermediate feature maps. iv. In one example, the network-size are controlled by a combination of features presented in last three bullets.

A discussion of the CNN filter models used for different temporal layers is provided.

Example 10

In a tenth embodiment, the group of NN filter model candidates may be the same or different for video units across different temporal layers. a. In one example, for video units in different temporal layers, the group of NN filter model candidates may be the same. b. In one example, an individual group of NN filter model candidates is used for each temporal layer. i. In one example, for video units in higher temporal layers, the filter group contains models with smaller size. 1) A smaller size means less feature maps, or feature maps with lower resolution, or shallower networks. c. In one example, temporal layers are grouped into several subgroups. For each subgroup, an individual group of NN filter model candidates is used.

General solutions are discussed.

In an eleventh embodiment, the indication of other in-loop filters (e.g., deblocking filter, SAO, ALF, CCALF, Bilateral filter) may be dependent on whether and/or how the NN filter is applied (e.g., the filter model index). a. In one example, the signaling of indications of the other in-loop filters may be conditionally signaled according to whether and/or how the NN filter is applied. b. In one example, whether and/or how the other in-loop filter is applied may depend on whether and/or how the NN filter is applied. c. In one example, if the NN filter is applied to one block, CCALF is disabled without being signaled.

In a twelfth embodiment, in all above examples, the term "neighboring blocks" could be an adjacent spatial neighboring block, or a non-adjacent spatial block in the same slice/tile/picture/subpicture. d. Alternatively, it may be a block (e.g., a located block) in a different picture compared to current picture which contains the current video unit. i. In one example, the different picture is restricted to be a reference picture of current picture/slice.

Embodiment examples are provided. 1. Derive the cnnlf_model_index[i] (i being 0 . . . M−1) for each CTU, where M is the number of total color channels. a. In one example, if cnnlf_model_idx[i]=0, 0≤i≤M−1, NN filter will not be used for the $i^{th}$ component. If cnnlf_model_idx[i]=k, 1≤k≤L (e.g., L=3), the $k^{th}$ cnnlf model will be used for the $i^{th}$ component. b. Parse slice_indication[i] (i being 0 . . . N−1), where N is no greater than the number of total color channels. i. In one example, if slice_indication[i]=k, 0≤k≤S (e.g., S=3), set cnnlf_model_index[i]=k for all CTUs in the current slice. If slice_indication[i]=(S+1), parse cnnlf_model_index[i] for the $i^{th}$ component for each CTU.

c. The cnnlf_model_index[i] parsing process for the $i^{th}$ component in a CTU is performed as follows. i. Parse the first bit. If it is 1, set cnnlf_model_index[i]=1, the parsing process ends. Otherwise, parse the second bit. If it is 1, set cnnlff_model_index[i]=2, the parsing process ends. Other wise, parse the third bit. If it is 1, set cnnlff_model_index[i]=3. If it is 0, set cnnlff_model_index[i]=0. 1) In one example, each bin is coded with one context in arithmetic coding.

2) For each CTU, if 1≤cnnlff_model_index[i]≤3, 1≤i≤3, use $k^{th}$ (k=cnnlff_model_index[i]) cnnlff model to filter the $i^{th}$ component.

Figure 13:
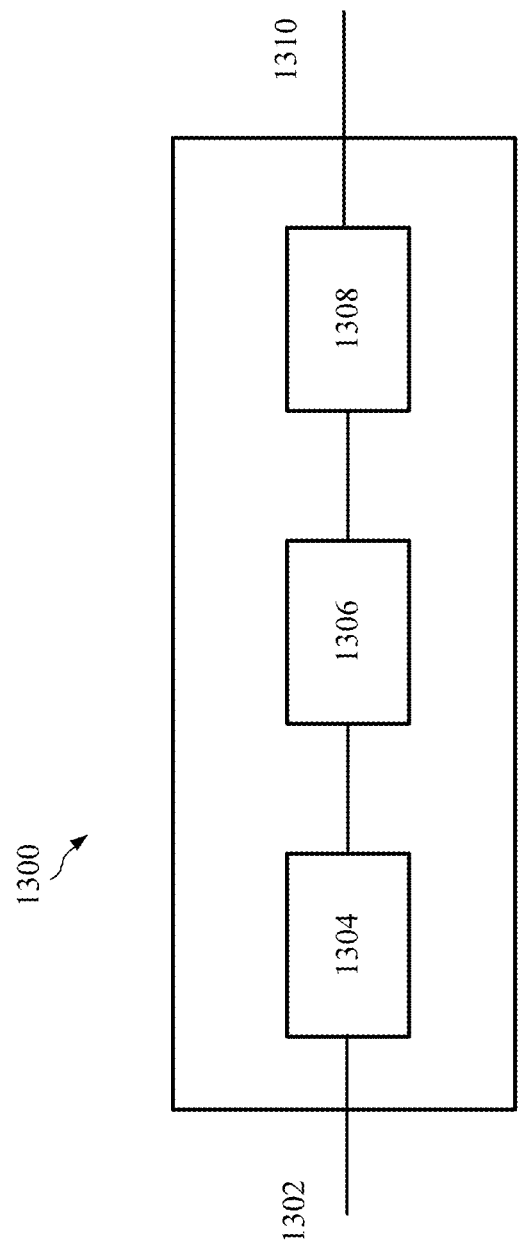
FIG. 13 is a block diagram showing an example video processing system.

FIG. 13 is a block diagram showing an example video processing system 1300 in which various techniques disclosed herein may be implemented. Various implementations may include some or all of the components of the video processing system 1300. The video processing system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1300 may include a coding component 1304 that may implement the various coding or encoding methods described in the present document. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 14:
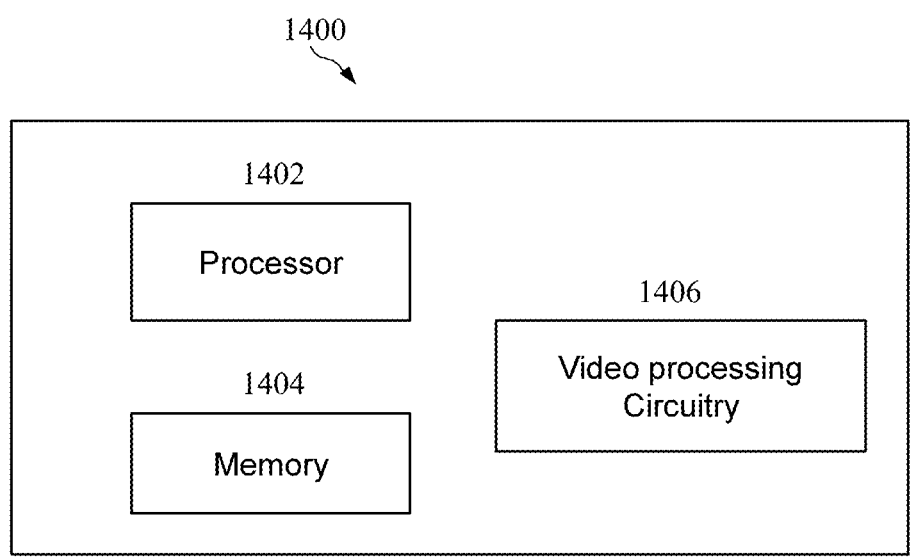
FIG. 14 is a block diagram of a video processing apparatus.

FIG. 14 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present document. The memory (memories) 1404 may be used for storing data and code used for implementing the methods and techniques described herein. The video processing hardware 1406 may be used to implement, in hardware circuitry, some techniques described in the present document. In some embodiments, the hardware 1406 may be partly or completely located within the processor 1402, e.g., a graphics processor.

Figure 15:
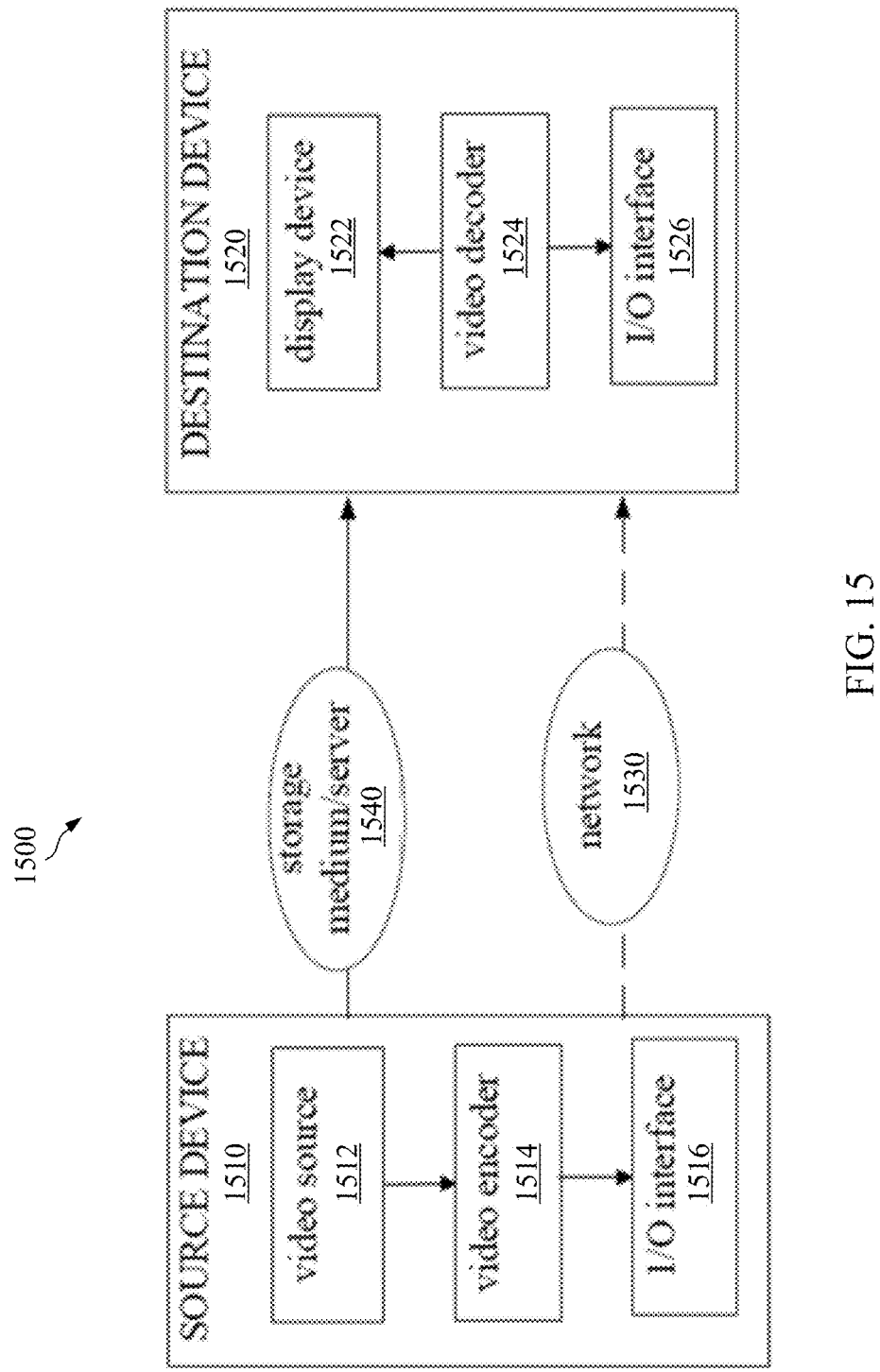
FIG. 15 is a block diagram that illustrates an example video coding system.

FIG. 15 is a block diagram that illustrates an example video coding system 1500 that may utilize the techniques of this disclosure. As shown in FIG. 15, the video coding system 1500 may include a source device 1510 and a destination device 1520. Source device 1510 generates encoded video data which may be referred to as a video encoding device. Destination device 1520 may decode the encoded video data generated by source device 1510 which may be referred to as a video decoding device.

Source device 1510 may include a video source 1512, a video encoder 1514, and an input/output (I/O) interface 1516.

Video source 1512 may include a source such as a video capture device, an interface to receive video data from a video content provider, and/or a computer graphics system for generating video data, or a combination of such sources. The video data may comprise one or more pictures. Video encoder 1514 encodes the video data from video source 1512 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1516 may include a modulator/demodulator (modem) and/or a transmitter. The encoded video data may be transmitted directly to destination device 1520 via I/O interface 1516 through network 1530. The encoded video data may also be stored onto a storage medium/server 1540 for access by destination device 1520.

Destination device 1520 may include an I/O interface 1526, a video decoder 1524, and a display device 1522.

I/O interface 1526 may include a receiver and/or a modem. I/O interface 1526 may acquire encoded video data from the source device 1510 or the storage medium/server 1540. Video decoder 1524 may decode the encoded video data. Display device 1522 may display the decoded video data to a user. Display device 1522 may be integrated with the destination device 1520, or may be external to destination device 1520 which may be configured to interface with an external display device.

Video encoder 1514 and video decoder 1524 may operate according to a video compression standard, such as the High Efficiency Video Coding (HEVC) standard, Versatile Video Coding (VVC) standard, and other current and/or further standards.

Figure 16:
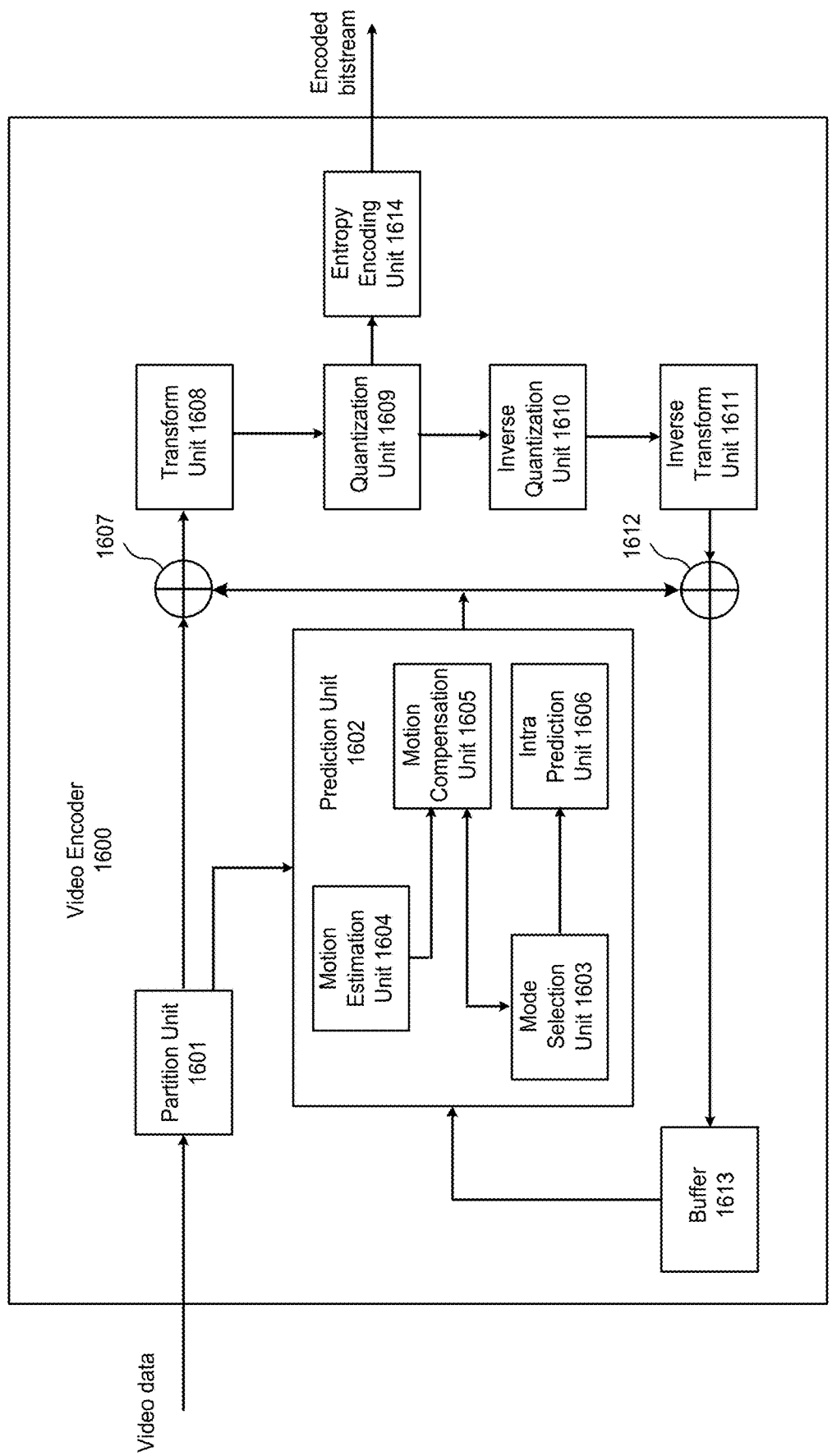
FIG. 16 is a block diagram illustrating an example of video encoder.

FIG. 16 is a block diagram illustrating an example of video encoder 1600, which may be video encoder 1514 in the video coding system 1500 illustrated in FIG. 15.

Video encoder 1600 may be configured to perform any or all of the techniques of this disclosure. In the example of FIG. 16, video encoder 1600 includes a plurality of functional components. The techniques described in this disclosure may be shared among the various components of video encoder 1600. In some examples, a processor may be configured to perform any or all of the techniques described in this disclosure.

The functional components of video encoder 1600 may include a partition unit 1601, a predication unit 1602 which may include a mode select unit 1603, a motion estimation unit 1604, a motion compensation unit 1605 and an intra prediction unit 1606, a residual generation unit 1607, a transform unit 1608, a quantization unit 1609, an inverse quantization unit 1610, an inverse transform unit 1611, a reconstruction unit 1612, a buffer 1613, and an entropy encoding unit 1614.

In other examples, video encoder 1600 may include more, fewer, or different functional components. In an example, predication unit 1602 may include an intra block copy (IBC) unit. The IBC unit may perform predication in an IBC mode in which at least one reference picture is a picture where the current video block is located.

Furthermore, some components, such as motion estimation unit 1604 and motion compensation unit 1605 may be highly integrated, but are represented in the example of FIG. 16 separately for purposes of explanation.

Partition unit 1601 may partition a picture into one or more video blocks. Video encoder 1514 and video decoder 1524 of FIG. 15 may support various video block sizes.

Mode select unit 1603 may select one of the coding modes, intra or inter, e.g., based on error results, and provide the resulting intra- or inter-coded block to a residual generation unit 1607 to generate residual block data and to a reconstruction unit 1612 to reconstruct the encoded block for use as a reference picture. In some examples, mode select unit 1603 may select a combination of intra and inter predication (CIIP) mode in which the predication is based on an inter predication signal and an intra predication signal. Mode select unit 1603 may also select a resolution for a motion vector (e.g., a sub-pixel or integer pixel precision) for the block in the case of inter-predication.

To perform inter prediction on a current video block, motion estimation unit 1604 may generate motion information for the current video block by comparing one or more reference frames from buffer 1613 to the current video block. Motion compensation unit 1605 may determine a predicted video block for the current video block based on the motion information and decoded samples of pictures from buffer 1613 other than the picture associated with the current video block.

Motion estimation unit 1604 and motion compensation unit 1605 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1604 may perform uni-directional prediction for the current video block, and motion estimation unit 1604 may search reference pictures of list 0 or list 1 for a reference video block for the current video block. Motion estimation unit 1604 may then generate a reference index that indicates the reference picture in list 0 or list 1 that contains the reference video block and a motion vector that indicates a spatial displacement between the current video block and the reference video block. Motion estimation unit 1604 may output the reference index, a prediction direction indicator, and the motion vector as the motion information of the current video block. Motion compensation unit 1605 may generate the predicted video block of the current block based on the reference video block indicated by the motion information of the current video block.

In other examples, motion estimation unit 1604 may perform bi-directional prediction for the current video block, motion estimation unit 1604 may search the reference pictures in list 0 for a reference video block for the current video block and may also search the reference pictures in list 1 for another reference video block for the current video block. Motion estimation unit 1604 may then generate reference indexes that indicate the reference pictures in list 0 and list 1 containing the reference video blocks and motion vectors that indicate spatial displacements between the reference video blocks and the current video block. Motion estimation unit 1604 may output the reference indexes and the motion vectors of the current video block as the motion information of the current video block. Motion compensation unit 1605 may generate the predicted video block of the current video block based on the reference video blocks indicated by the motion information of the current video block.

In some examples, motion estimation unit 1604 may output a full set of motion information for decoding processing of a decoder.

In some examples, motion estimation unit 1604 may not output a full set of motion information for the current video. Rather, motion estimation unit 1604 may signal the motion information of the current video block with reference to the motion information of another video block. For example, motion estimation unit 1604 may determine that the motion information of the current video block is sufficiently similar to the motion information of a neighboring video block.

In one example, motion estimation unit 1604 may indicate, in a syntax structure associated with the current video block, a value that indicates to the video decoder 1524 that the current video block has the same motion information as another video block.

In another example, motion estimation unit 1604 may identify, in a syntax structure associated with the current video block, another video block and a motion vector difference (MVD). The motion vector difference indicates a difference between the motion vector of the current video block and the motion vector of the indicated video block. The video decoder 1524 may use the motion vector of the indicated video block and the motion vector difference to determine the motion vector of the current video block.

As discussed above, video encoder 1514 may predictively signal the motion vector. Two examples of predictive signaling techniques that may be implemented by video encoder 1514 include advanced motion vector predication (AMVP) and merge mode signaling.

Intra prediction unit 1606 may perform intra prediction on the current video block. When intra prediction unit 1606 performs intra prediction on the current video block, intra prediction unit 1606 may generate prediction data for the current video block based on decoded samples of other video blocks in the same picture. The prediction data for the current video block may include a predicted video block and various syntax elements.

Residual generation unit 1607 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1607 may not perform the subtracting operation.

Transform unit 1608 may generate one or more transform coefficient video blocks for the current video block by applying one or more transforms to a residual video block associated with the current video block.

After transform unit 1608 generates a transform coefficient video block associated with the current video block, quantization unit 1609 may quantize the transform coefficient video block associated with the current video block based on one or more quantization parameter (QP) values associated with the current video block.

Inverse quantization unit 1610 and inverse transform unit 1611 may apply inverse quantization and inverse transforms to the transform coefficient video block, respectively, to reconstruct a residual video block from the transform coefficient video block. Reconstruction unit 1612 may add the reconstructed residual video block to corresponding samples from one or more predicted video blocks generated by the predication unit 1602 to produce a reconstructed video block associated with the current block for storage in the buffer 1613.

After reconstruction unit 1612 reconstructs the video block, loop filtering operation may be performed to reduce video blocking artifacts in the video block.

Entropy encoding unit 1614 may receive data from other functional components of the video encoder 1600. When entropy encoding unit 1614 receives the data, entropy encoding unit 1614 may perform one or more entropy encoding operations to generate entropy encoded data and output a bitstream that includes the entropy encoded data.

Figure 17:
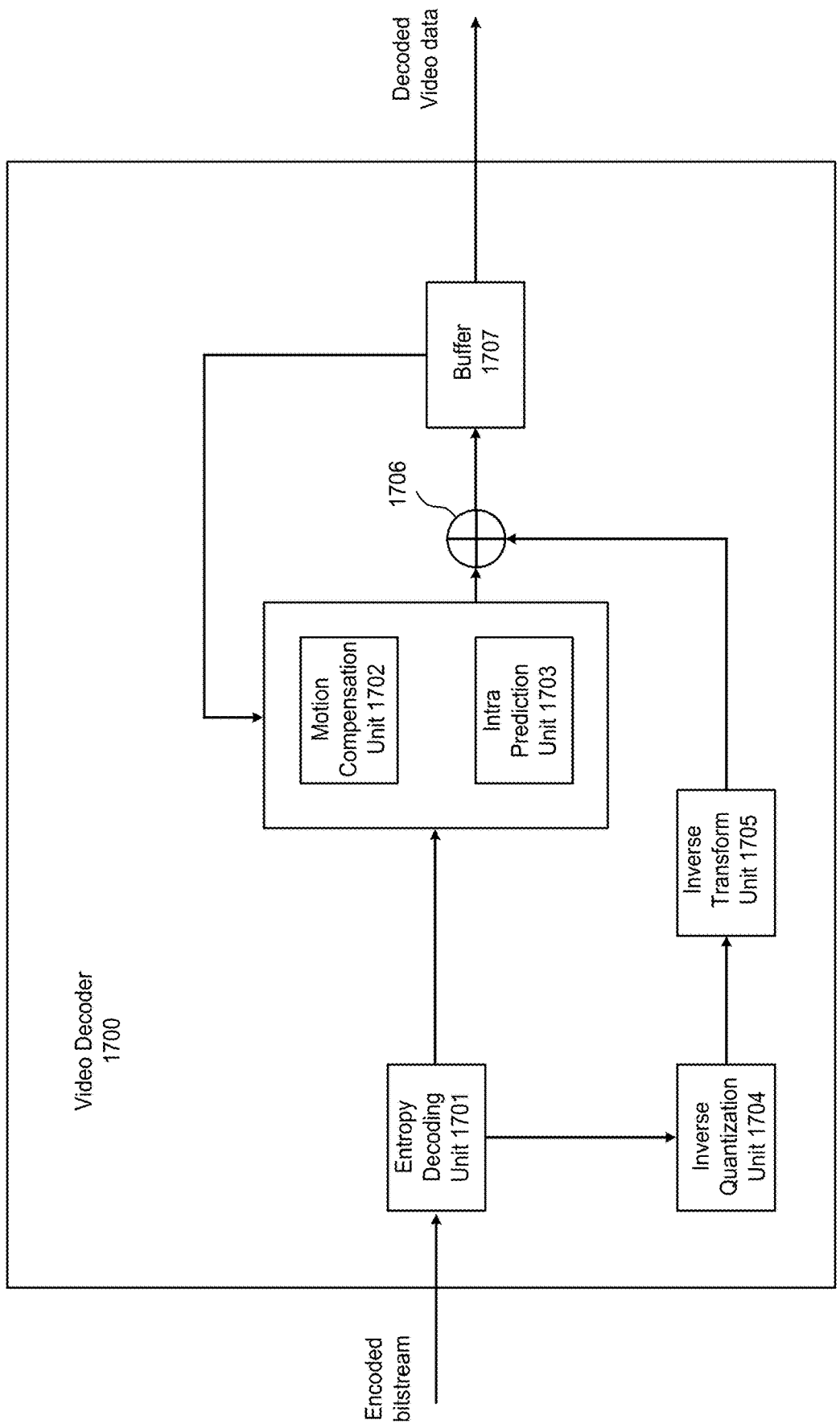
FIG. 17 is a block diagram illustrating an example of video decoder.

FIG. 17 is a block diagram illustrating an example of video decoder 1700, which may be video decoder 1524 in the video coding system 1500 illustrated in FIG. 15.

The video decoder 1700 may be configured to perform any or all of the techniques of this disclosure. In the example of FIG. 17, the video decoder 1700 includes a plurality of functional components. The techniques described in this disclosure may be shared among the various components of the video decoder 1700. In some examples, a processor may be configured to perform any or all of the techniques described in this disclosure.

In the example of FIG. 17, video decoder 1700 includes an entropy decoding unit 1701, a motion compensation unit 1702, an intra prediction unit 1703, an inverse quantization unit 1704, an inverse transformation unit 1705, and a reconstruction unit 1706 and a buffer 1707. Video decoder 1700 may, in some examples, perform a decoding pass generally reciprocal to the encoding pass described with respect to video encoder 1514 (FIG. 15).

Entropy decoding unit 1701 may retrieve an encoded bitstream. The encoded bitstream may include entropy coded video data (e.g., encoded blocks of video data). Entropy decoding unit 1701 may decode the entropy coded video data, and from the entropy decoded video data, motion compensation unit 1702 may determine motion information including motion vectors, motion vector precision, reference picture list indexes, and other motion information. Motion compensation unit 1702 may, for example, determine such information by performing the AMVP and merge mode signaling.

Motion compensation unit 1702 may produce motion compensated blocks, possibly performing interpolation based on interpolation filters. Identifiers for interpolation filters to be used with sub-pixel precision may be included in the syntax elements.

Motion compensation unit 1702 may use interpolation filters as used by video encoder 1514 during encoding of the video block to calculate interpolated values for sub-integer pixels of a reference block. Motion compensation unit 1702 may determine the interpolation filters used by video encoder 1514 according to received syntax information and use the interpolation filters to produce predictive blocks.

Motion compensation unit 1702 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1703 may use intra prediction modes for example received in the bitstream to form a prediction block from spatially adjacent blocks. Inverse quantization unit 1704 inverse quantizes, i.e., de-quantizes, the quantized video block coefficients provided in the bitstream and decoded by entropy decoding unit 1701. Inverse transform unit 1705 applies an inverse transform.

Reconstruction unit 1706 may sum the residual blocks with the corresponding prediction blocks generated by motion compensation unit 1702 or intra-prediction unit 1703 to form decoded blocks. If desired, a deblocking filter may also be applied to filter the decoded blocks in order to remove blockiness artifacts. The decoded video blocks are then stored in buffer 1707, which provides reference blocks for subsequent motion compensation/intra predication and also produces decoded video for presentation on a display device.

Figure 18:
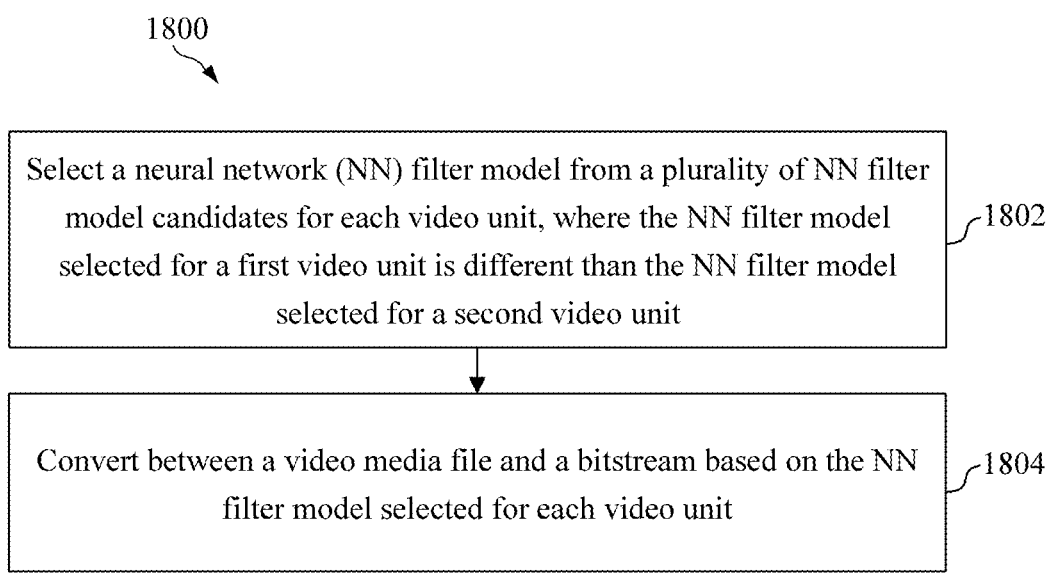
FIG. 18 is a method for coding video data according to an embodiment of the disclosure.

FIG. 18 is a method 1800 for coding video data according to an embodiment of the disclosure. The method 1800 may be performed by a coding apparatus (e.g., an encoder) having a processor and a memory. The method 1800 may be implemented when determining how to select or apply a NN filter model to a video unit.

In block 1802, the coding apparatus selects a neural network (NN) filter model from a plurality of NN filter model candidates for each video unit. In an embodiment, the NN filter model selected for a first video unit (e.g., a first slice, a first sample in a slice) is different than the NN filter model selected for a second video unit (e.g., a second slice, a second sample in the slice). In block 1804, the coding apparatus converts between a video media file and a bitstream based on the NN filter model selected for each video unit.

When implemented in an encoder, converting includes receiving a media file (e.g., a video unit) and encoding an index corresponding to the one or more NN filter models that were selected for the media file into a bitstream.

When implemented in a decoder, converting includes receiving a bitstream including an index corresponding to one or more NN filter models that were selected for a media file, and decoding the bitstream to obtain the index corresponding to the one or more NN filter models that were selected for a media file.

In an embodiment, the method 1800 may utilize or incorporate one or more of the features or processes of the other methods disclosed herein.

A listing of solutions preferred by some embodiments is provided next.

The following solutions show example embodiments of techniques discussed in the present disclosure.

1. A method of video processing, comprising: determining, for a conversion between a video unit of a video and a coded representation of the video, one or more neural network (NN) models for a deblocking filter used for the conversion; and performing the conversion based on the determining; wherein the one or more NN models are determined based on a rule of selection from among multiple NN candidate models available for the video unit.

2. The method of solution 1, wherein the rule of selection specifies that the one or more NN models is selected on a per video unit basis.

3. The method of solution 1, wherein the one or more NN models comprise greater than one NN models.

4. The method of any of solutions 1-3, wherein the one or more NN models are indicated in the coded representation 5. The method of any of solutions 1-3, wherein the one or more NN models are indicated in the coded representation using corresponding one or more indices.

6. The method of solution 5, wherein the rule of selection specifies that different color components of the video share the one or more NN models.

7. The method of solution 5, wherein the rule of selection specifies that different color components of the video have different of the one or more NN models.

8. The method of solution 1, wherein the determining is based on a coding information of the video unit and/or a coding information of one or more neighboring video units.

The following solutions show example embodiments of techniques discussed in the present disclosure.

9. A method of video processing, comprising: performing a conversion between a video unit of a video and a coded representation of the video, wherein, the coded representation conforms to a rule, wherein the rule specifies whether and how one or more neural network (NN) models for a deblocking filter used for the conversion are indicated in the coded representation.

10. The method of solution 9, wherein the rule specifies that multiple NN models are included for the video unit at a first level and wherein the rule further specifies that a correspondence between an NN model from the multiple models and a sub-region of the video unit at a second level is determined according to a coding condition of the video.

11. The method of solution 10, wherein the first level is a picture level or a slice level and the second level is a coding tree unit or a coding tree block level.

The following solutions show example embodiments of techniques discussed in the present disclosure.

12. The method of solution 9, wherein the rule specifies that the one or more NN models are enabled according to a syntax element in the coded representations.

The following solutions show example embodiments of techniques discussed in the present disclosure.

13. The method of solution 9, wherein the rule specifies that the NN models are selectively indicated in the coded representation based on a condition.

14. The method of solution 13, wherein the condition is that use of the one or more NN models is enabled for the video unit.

The following solutions show example embodiments of techniques discussed in the present disclosure.

15. A method of video processing, comprising: performing a conversion between a video unit of a video and a coded representation of the video according to a rule; wherein the rule specifies a relationship between a computational neural network (CNN) model used for a deblocking filter used during the conversion and a quality of reconstructed video of the video unit and/or a syntax structure used for indicating the CNN model.

16. The method of solution 15, wherein the rule specifies a pre-trained CNN model for each quality level.

17. The method of solution 15, wherein the rule specifies a relationship between a quantization parameter level and the CNN model.

The following solutions show example embodiments of techniques discussed in the present disclosure.

18. A method of video processing, comprising: performing a conversion between a video comprising multiple temporal layers and a coded representation of the video according to a rule; wherein the rule specifies a relationship between computational neural network (CNN) models used for a deblocking filtering of corresponding, or co-positioned, video units across different temporal layers.

19. The method of solution 18, wherein the rule specifies to use a same CNN model for corresponding video units across different temporal layers.

20. The method of solution 18, wherein the rule specifies to organize temporal layers into different subgroups such that a same CNN model is used for corresponding video units in each subgroup.

21. The method of any of solutions 1-20, wherein the conversion comprises parsing and decoding the coded representation to generate the video.

22. The method of any of solutions 1-20, wherein the conversion comprises encoding the video to generate the coded representation.

23. A video decoding apparatus comprising a processor configured to implement a method recited in one or more of solutions 1 to 22.

24. A video encoding apparatus comprising a processor configured to implement a method recited in one or more of solutions 1 to 22.

25. A computer program product having computer code stored thereon, the code, when executed by a processor, causes the processor to implement a method recited in any of solutions 1 to 22.

26. A method, apparatus or system described in the present document. The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The following documents are incorporated by reference in their entirety:

[1] Johannes Ballé, Valero Laparra, and Eero P Simoncelli, "End-to-end optimization of nonlinear transform codes for perceptual quality," PCS IEEE (2016), 1-5.

[2] Lucas Theis, Wenzhe Shi, Andrew Cunningham, and Ferenc Huszár, "Lossy image compression with compressive autoencoders," arXiv preprint arXiv: 1703.00395 (2017).

[3] Jiahao Li, Bin Li, Jizheng Xu, Ruiqin Xiong, and Wen Gao, "Fully Connected Network-Based Intra Prediction for Image Coding, "IEEE Transactions on Image Processing" 27, 7 (2018), 3236-3247.

[4] Yuanying Dai, Dong Liu, and Feng Wu, "A convolutional neural network approach for post-processing in HEVC intra coding," MMM. Springer, 28-39.

[5] Rui Song, Dong Liu, Houqiang Li, and Feng Wu, "Neural network-based arithmetic coding of intra prediction modes in HEVC," VCIP IEEE (2017), 1-4.

[6] J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method implemented by a video coding apparatus, comprising:
    selecting a neural network (NN) filter model from a plurality of NN filter model candidates for each video unit, wherein the plurality of NN filter model candidates is dependent upon a tree partition structure for the video unit, wherein the tree partition structure comprises single tree or dual tree, and wherein the NN filter model selected for a first video unit is different than the NN filter model selected for a second video unit; and
    converting between a video media file and a bitstream based on the NN filter model selected for each video unit.

2. The method of claim 1, further comprising deriving an NN filter model index containing the plurality of NN filter model candidates prior to the selecting.

3. The method of claim 1, wherein the video unit is one of a sequence of pictures, a picture, a slice, a tile, a brick, a sub-picture, a coding tree unit (CTU), a CTU row, and a coding unit (CU), and wherein each of the sequence of pictures, the picture, the slice, the tile, the brick, the sub-picture, the CTU, the CTU row, and the CU may use a different NN filter model candidate from the plurality of NN filter model candidates.

4. The method of claim 1, wherein the plurality of NN filter model candidates contain a first set of NN filter model candidates for luma components of the video unit and a second set of NN filter model candidates for chroma components of the video unit.

5. The method of claim 4, wherein the first set of NN filter model candidates contains a different number of the NN filter model candidates than the second set of NN filter model candidates.

6. The method of claim 1, wherein one or more syntax elements are signaled or derived to represent an NN filter model index, and wherein the NN filter model index corresponds to an NN filter model candidate.

7. The method of claim 6, wherein the NN filter model index corresponds to one of the plurality of NN filter model candidates.

8. The method of claim 1, wherein an NN filter model index that identifies one or more of the plurality of NN filter model candidates is signaled for each color component in the video unit.

9. The method of claim 6, wherein a flag indicating whether the NN filter model index is shared by different color components in the video unit is signaled.

10. The method of claim 1, wherein a flag indicating whether the NN filter model selected is to be utilized for the video unit or for color components of the video unit is signaled.

11. The method of claim 10, wherein the flag is binarized to a bin string, and at least one bin is coded with one or more contexts or coded with a bypass mode.

12. The method of claim 10, wherein the flag is binarized with a fixed length code, a unary code, a truncated unary code, an Exponential-Golomb code, or a truncated Exponential-Golomb code.

13. The method of claim 10, wherein the flag is binarized based on coding information of a current block or neighboring block, and wherein the coding information includes one or more quantization parameters.

14. The method of claim 6, wherein a flag is signaled to indicate whether the NN filter model index is at least partially predicted based on a previous NN filter model index or is inherited from the previous NN filter model index.

15. The method of claim 10, wherein the flag is signaled at a picture level, at a slice level, at a coding tree block (CTB) level, or a coding tree unit (CTU) level.

16. The method of claim 10, wherein the flag indicates how the NN filter model should be applied to sub-video units within the video unit or how an NN filter model index should be signaled for the sub-video units.

17. The method of claim 10, wherein the flag indicates whether all samples within the video unit share a same on and off control and indicates the NN filter model to apply to the samples.

18. An apparatus for coding video data comprising a processor and a non-transitory memory with instructions thereon, wherein the instructions upon execution by the processor cause the processor to:
select a neural network (NN) filter model from a plurality of NN filter model candidates for each video unit, wherein the plurality of NN filter model candidates is dependent upon a tree partition structure for the video unit, wherein the tree partition structure comprises single tree or dual tree, and wherein the NN filter model selected for a first video unit is different than the NN filter model selected for a second video unit; and
convert between a video media file and a bitstream based on the NN filter model selected for each video unit.

19. A non-transitory computer readable medium comprising a computer program product for use by a coding apparatus, the computer program product comprising computer executable instructions stored on the non-transitory computer readable medium that, when executed by one or more processors, cause the coding apparatus to:
select a neural network (NN) filter model from a plurality of NN filter model candidates for each video unit, wherein the plurality of NN filter model candidates is dependent upon a tree partition structure for the video unit, wherein the tree partition structure comprises single tree or dual tree, and wherein the NN filter model selected for a first video unit is different than the NN filter model selected for a second video unit; and
convert between a video media file and a bitstream based on the NN filter model selected for each video unit.

20. The apparatus of claim 18, wherein the instructions upon execution by the processor cause the processor to derive an NN filter model index containing the plurality of NN filter model candidates prior to selection of the NN filter model.

* * * * *